United States Patent [19]

Fischer

[11] Patent Number: 5,371,734
[45] Date of Patent: Dec. 6, 1994

[54] MEDIUM ACCESS CONTROL PROTOCOL FOR WIRELESS NETWORK

[75] Inventor: Michael A. Fischer, San Antonio, Tex.

[73] Assignee: Digital Ocean, Inc., Overland Park, Kans.

[21] Appl. No.: 11,415

[22] Filed: Jan. 29, 1993

[51] Int. Cl.⁵ .................. H04B 7/216; H04B 7/26
[52] U.S. Cl. .................. 370/18; 370/95.1; 370/95.3; 340/825.47; 455/38.2; 455/54.2
[58] Field of Search .......... 370/18, 95.1, 95.3; 340/825.44, 825.47; 455/38.2, 38.3, 53.1, 54.1, 54.2, 68, 69, 70

[56] References Cited

U.S. PATENT DOCUMENTS

| | | | |
|---|---|---|---|
| 4,449,248 | 5/1984 | Leslie et al. | 455/38.3 |
| 5,241,542 | 8/1993 | Natarajan et al. | 455/38.3 |
| 5,276,680 | 1/1994 | Messenger | 370/95.1 |

OTHER PUBLICATIONS

AS-100 Spread Spectrum ASIC, Signal Technologies, Inc., Nov. 14, 1991.
CSL-100 MOD/DEMOD ASIC, Signal Tech. Inc., Nov. 14, 1991.
Model 200 RF Modem, Signal Tech., Inc., Nov. 14, 1991.

Primary Examiner—Wellington Chin
Attorney, Agent, or Firm—John R. Ley

[57] ABSTRACT

A communicator station wirelessly transmits frames to and receives frames from a least one additional communicator in a Group in accordance with a MAC protocol. One of the communicators functions as a hub and the remaining communicators function as remotes. The hub sends control information to the hubs to establish repeating communication cycles, each of which has intervals during which the hub and the remotes transmit and receive frames. The intervals allow the hub and the remotes to anticipate transmitting and receiving frames, thereby allowing the remotes to power off their receivers and transmitters to achieve a considerable savings in power consumption without degrading communications. Other improved features include adjusting the intervals and the durations of transmission opportunities in the communication cycle to obtain the beneficial aspects of TDMA and PRMA for LAN-like communication without also incurring most of the undesirable aspects of such MAC techniques. Other control functions such as arbitration determine which communicator is better suited to act as the hub.

47 Claims, 12 Drawing Sheets

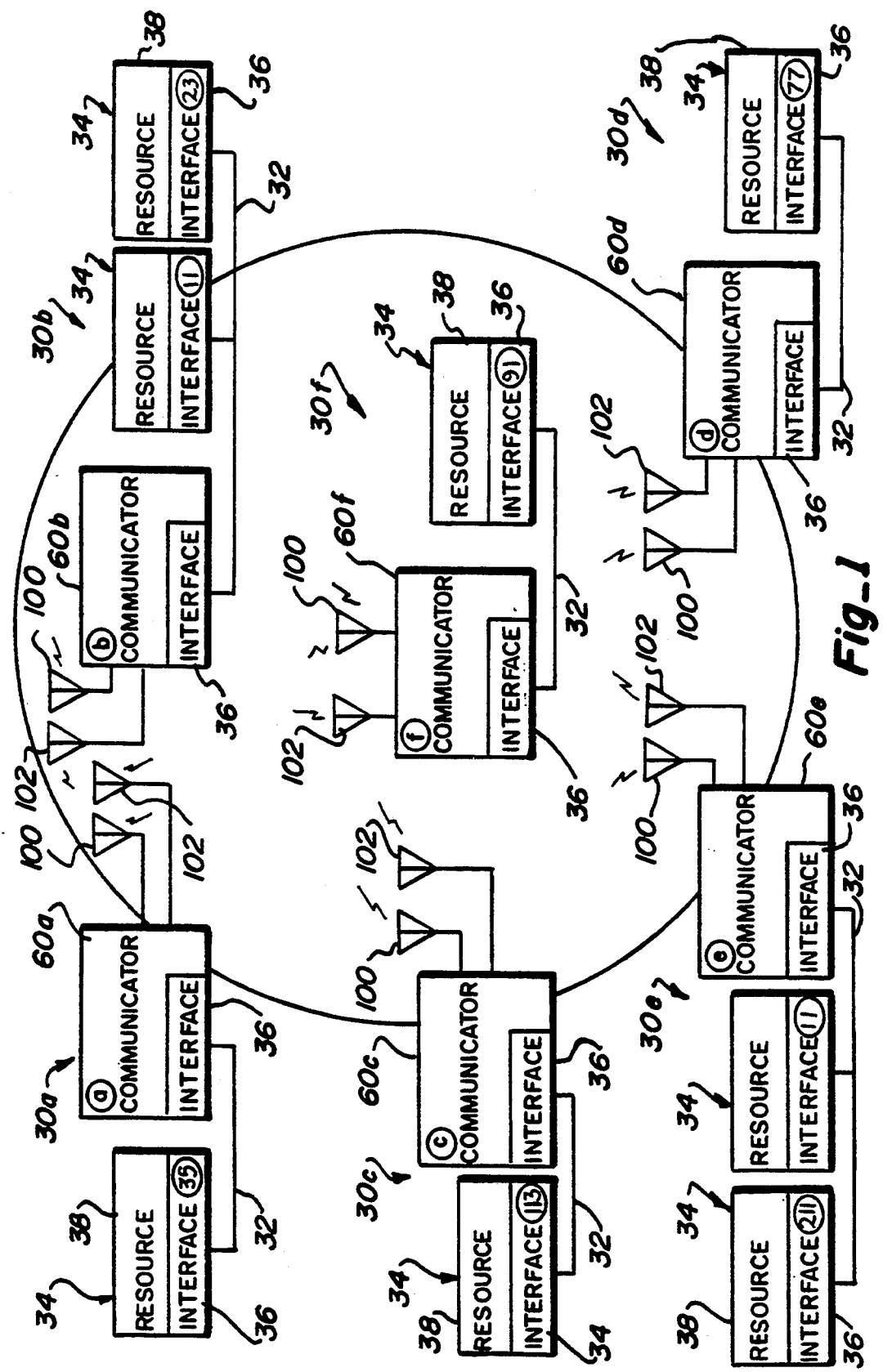
Fig_1

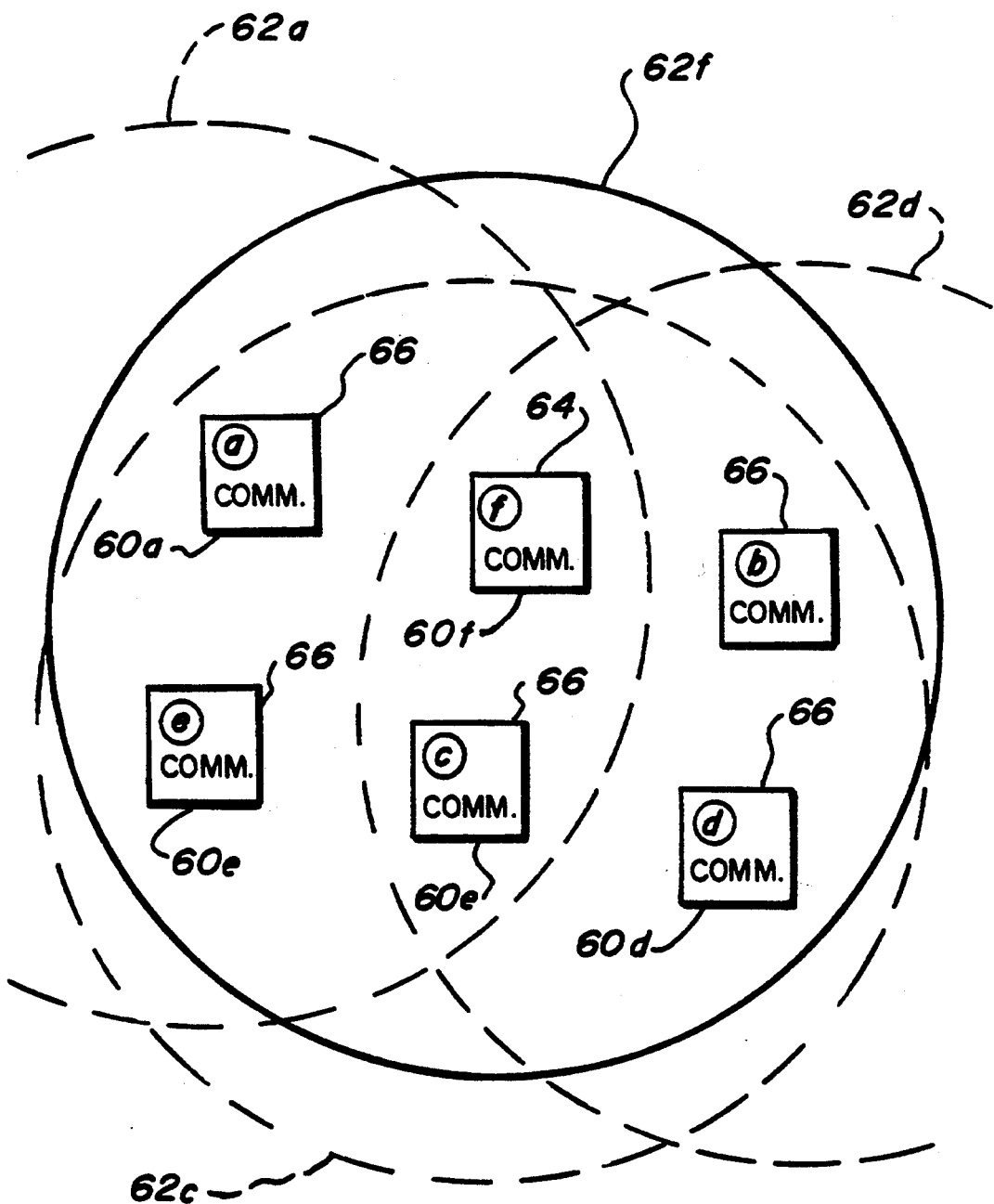
Fig_2

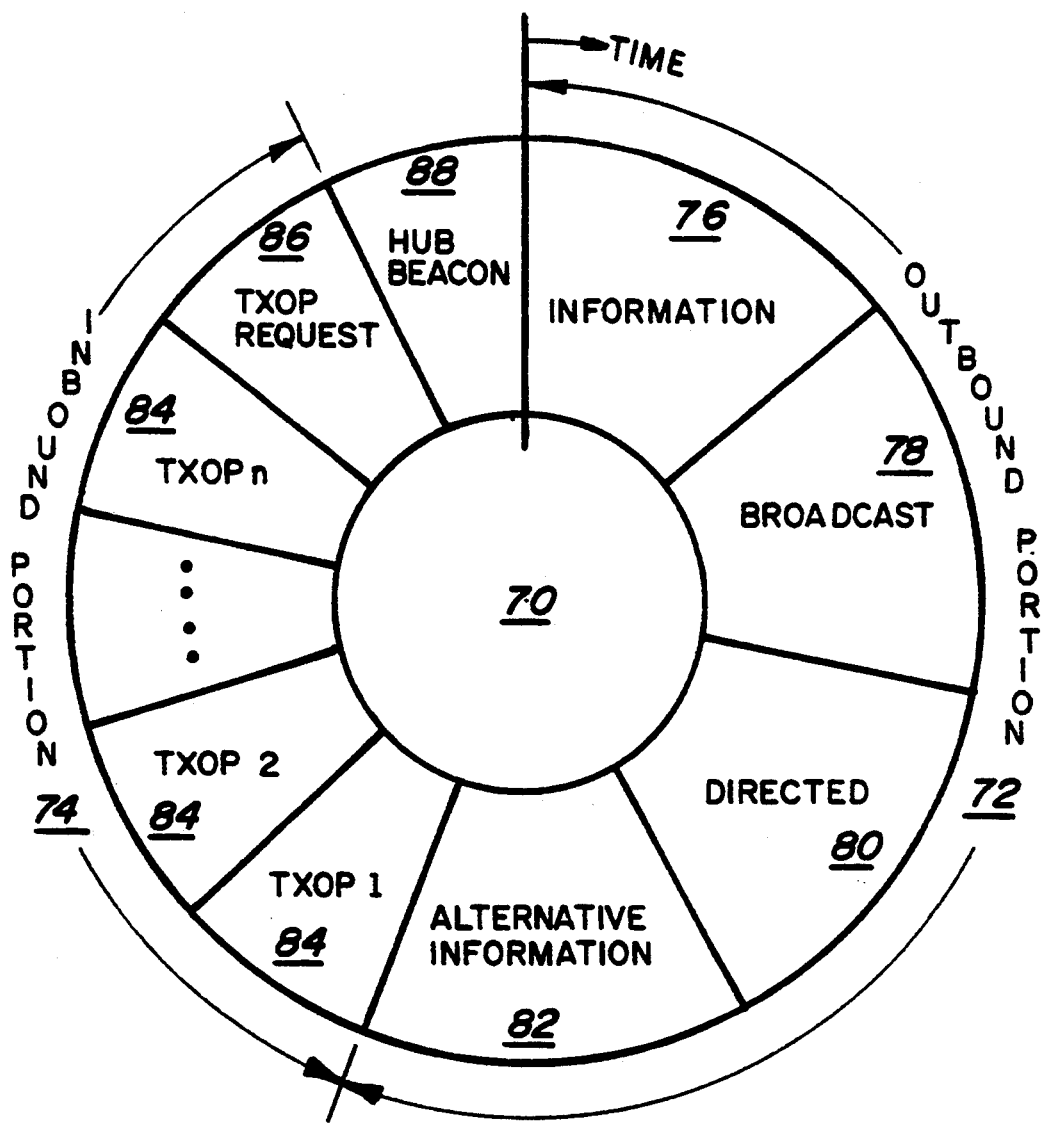
Fig_3

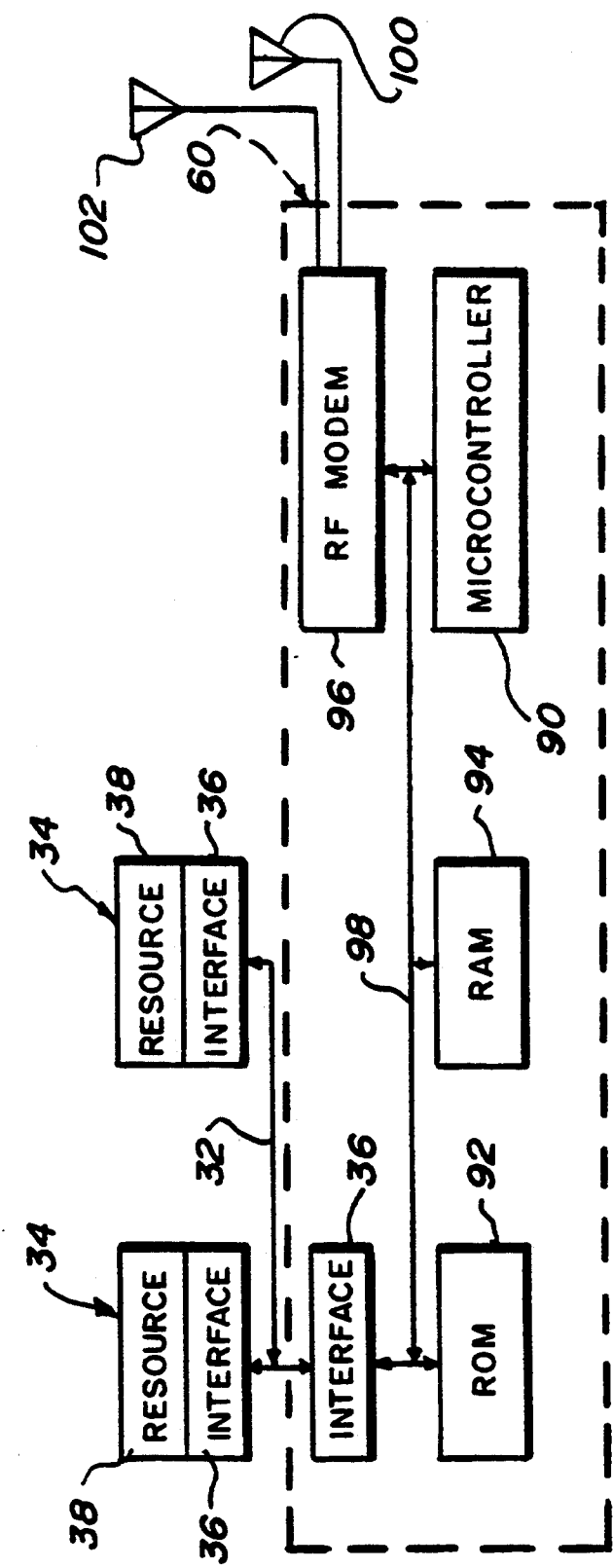
Fig_4

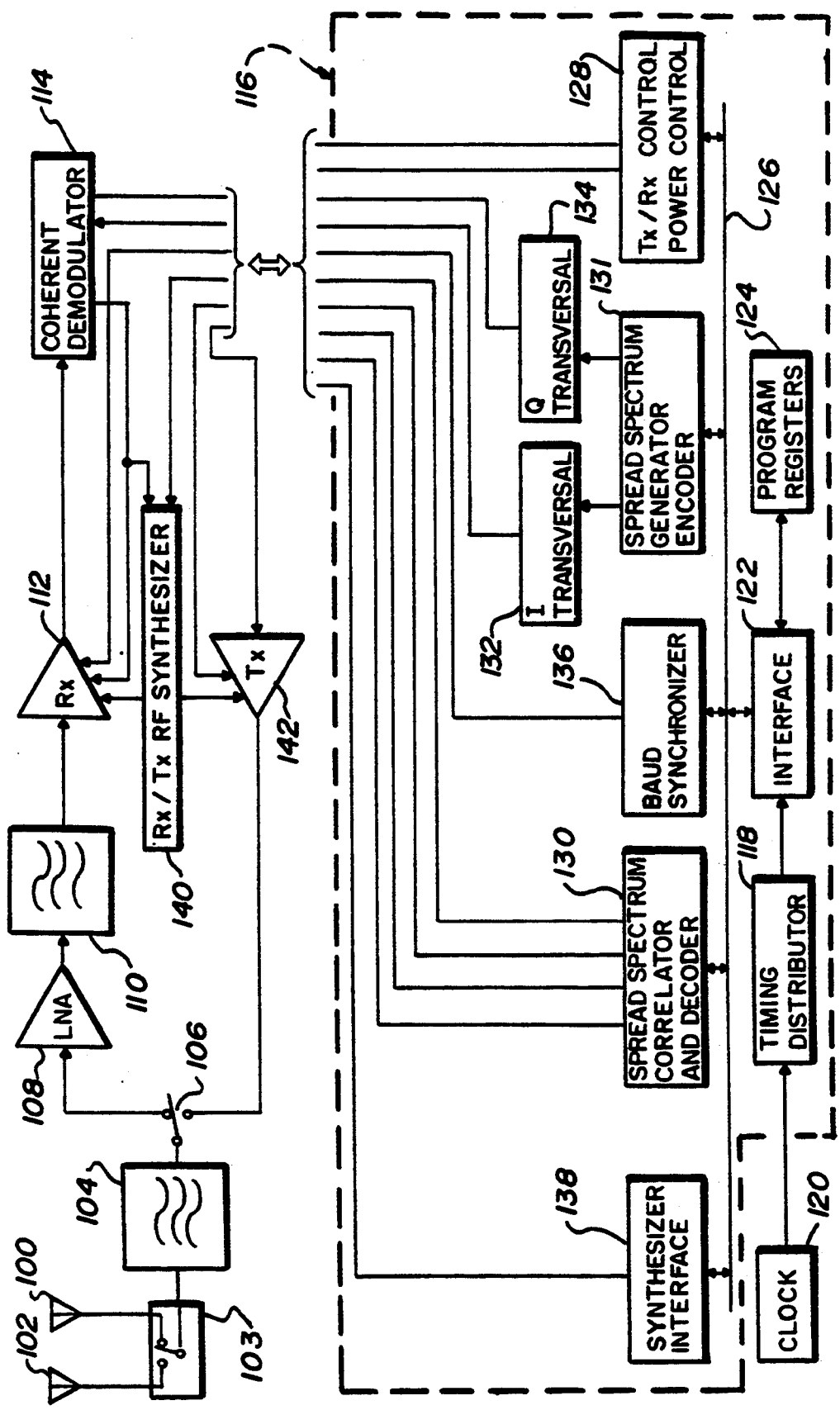
Fig_5

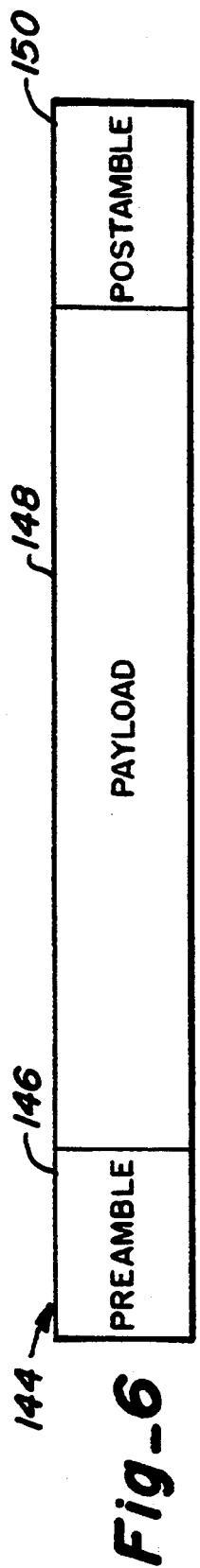
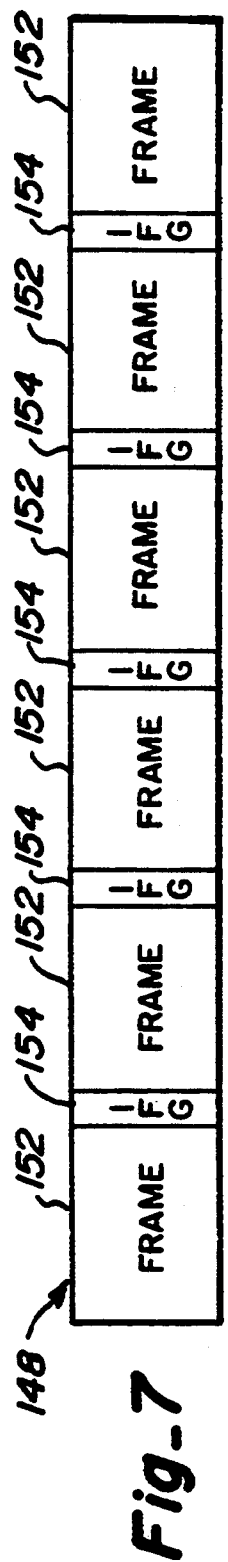
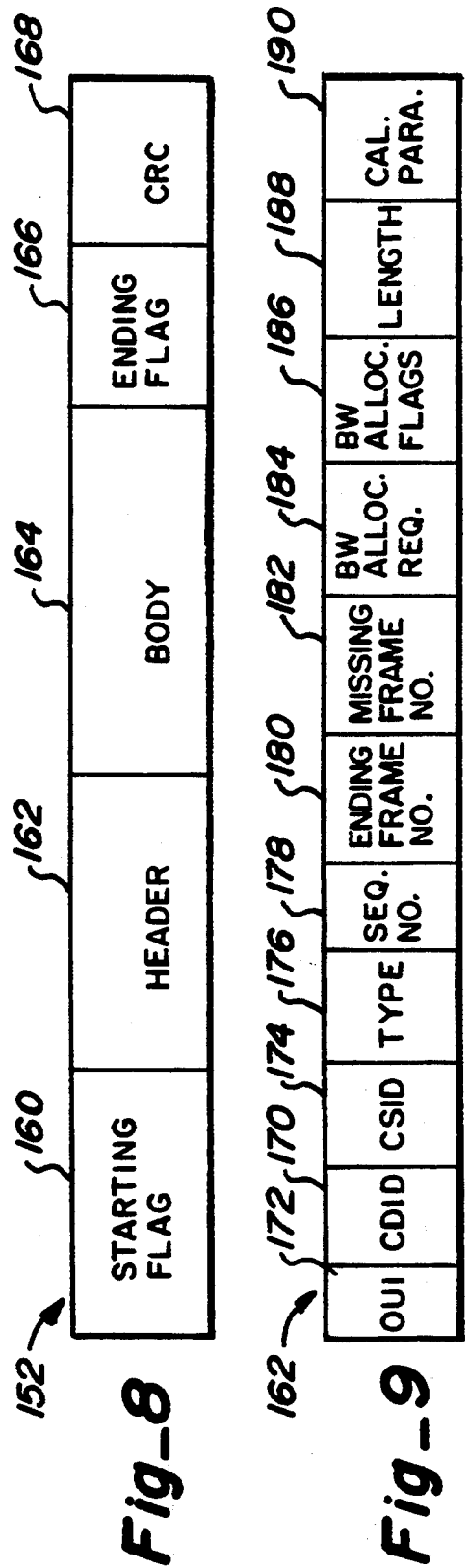

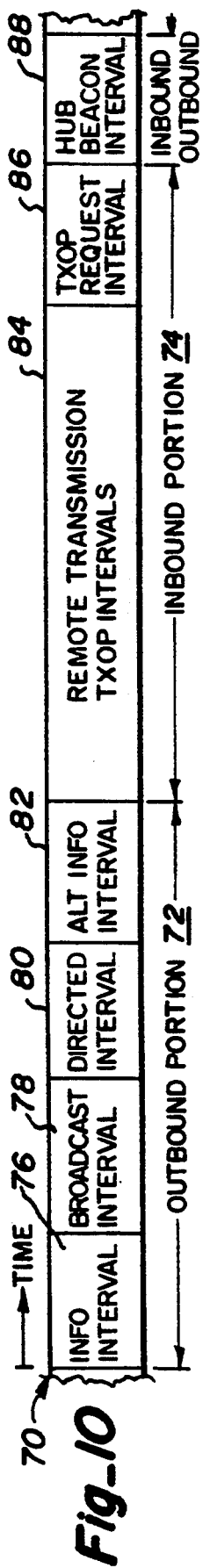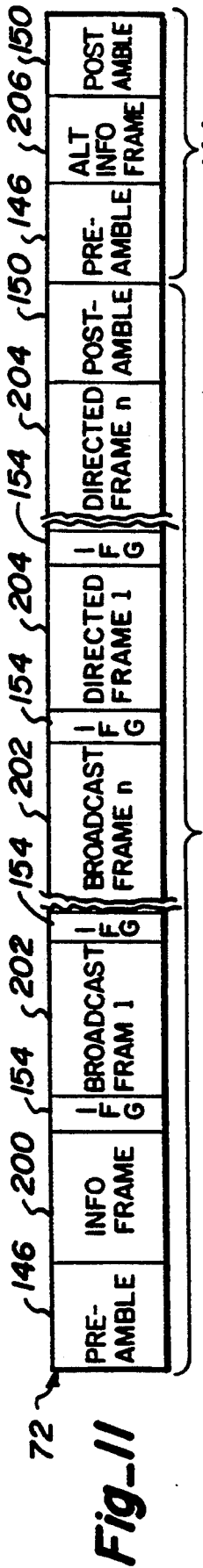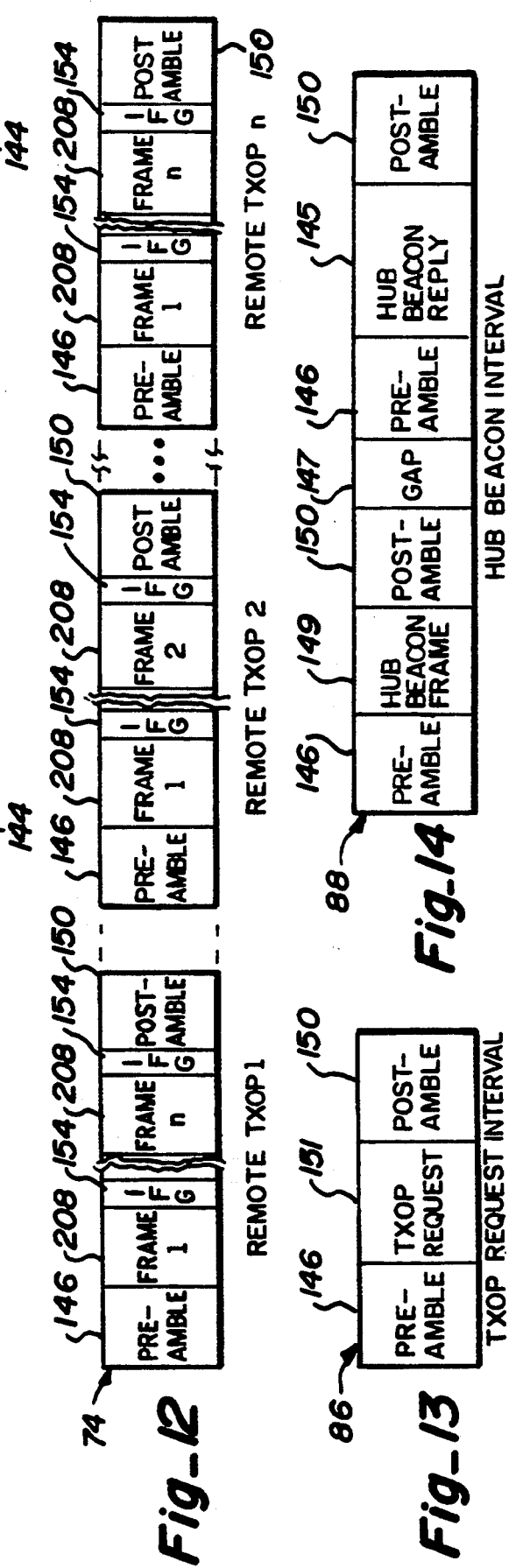

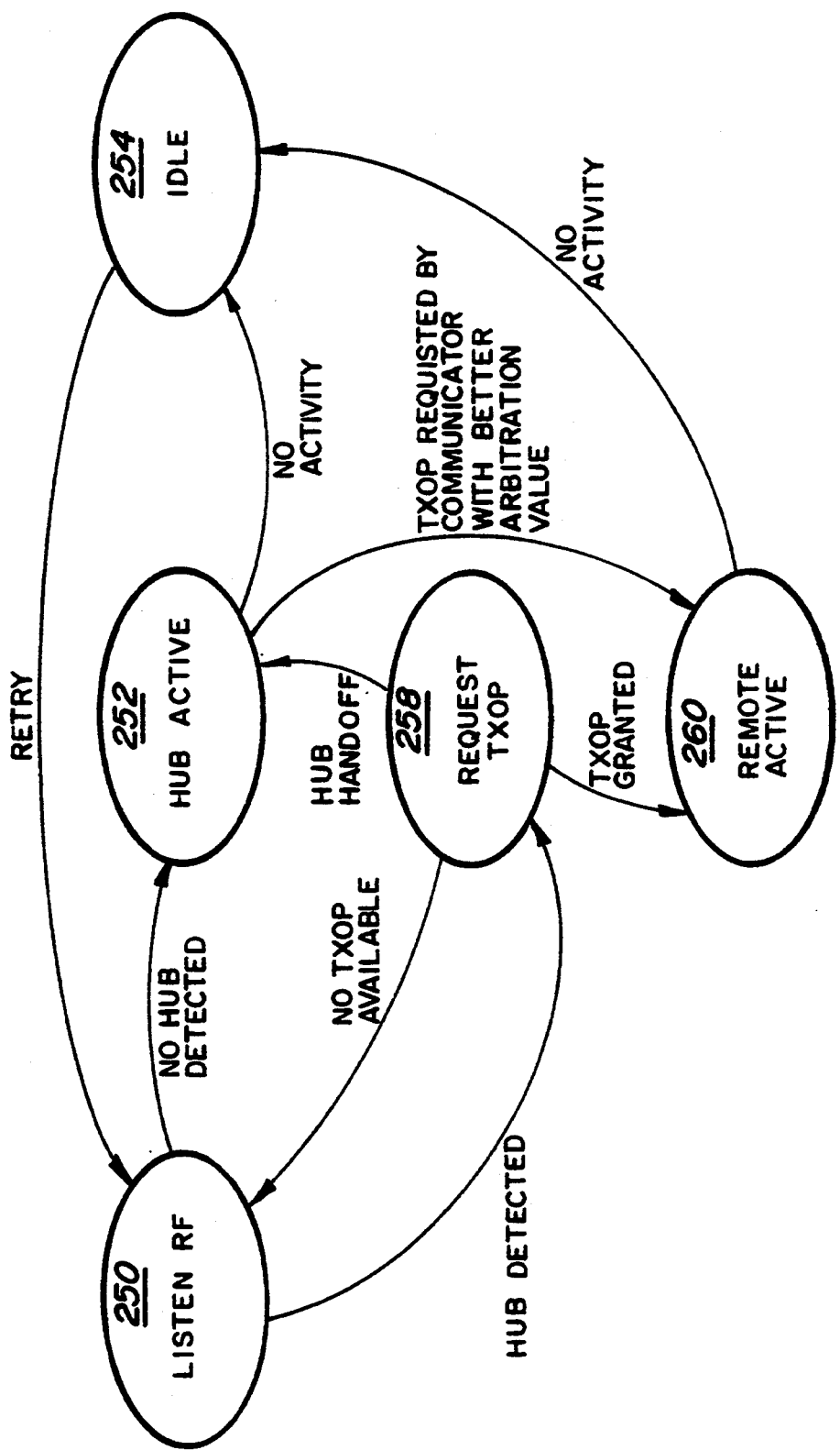
Fig_15

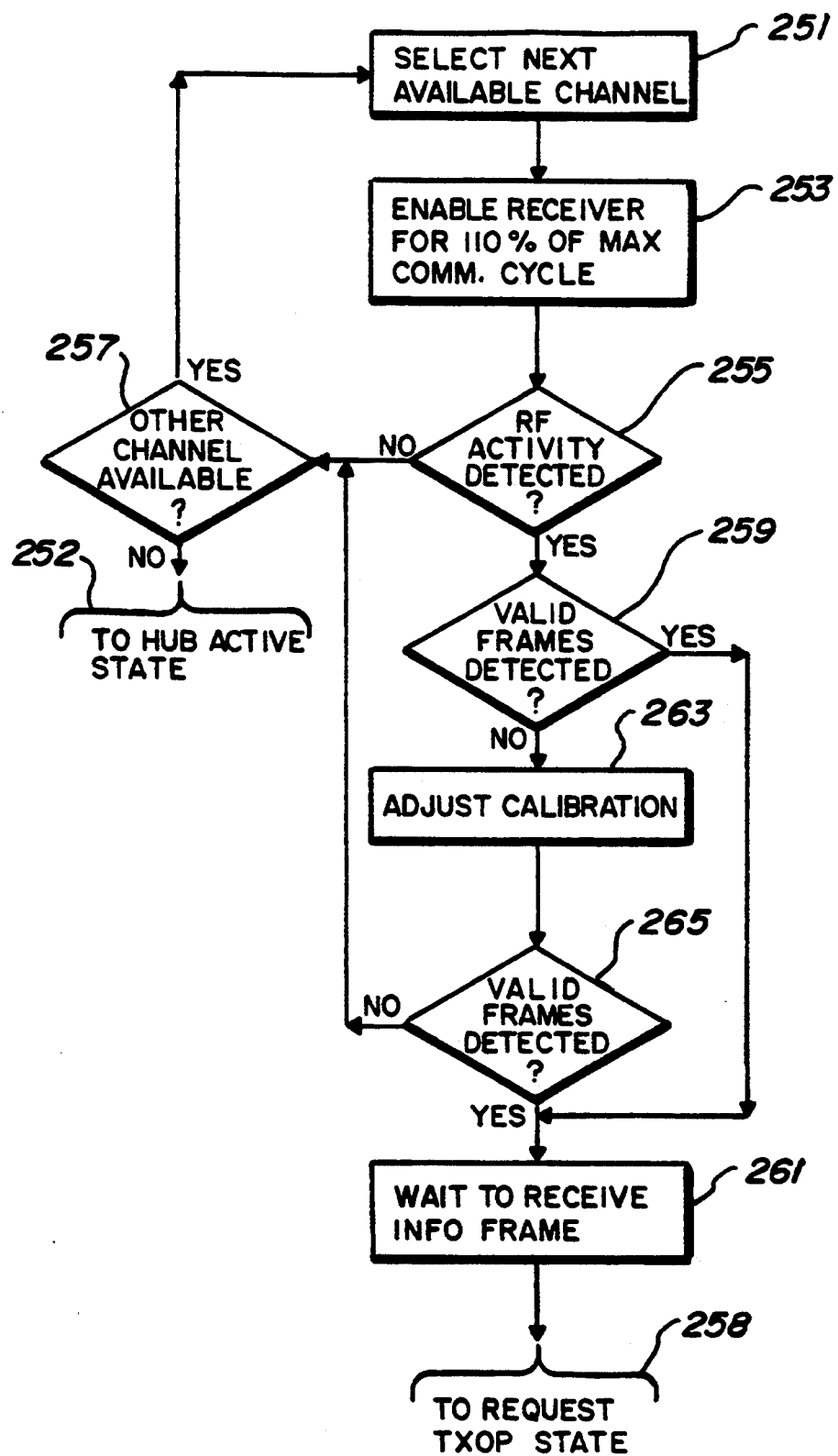
Fig_16

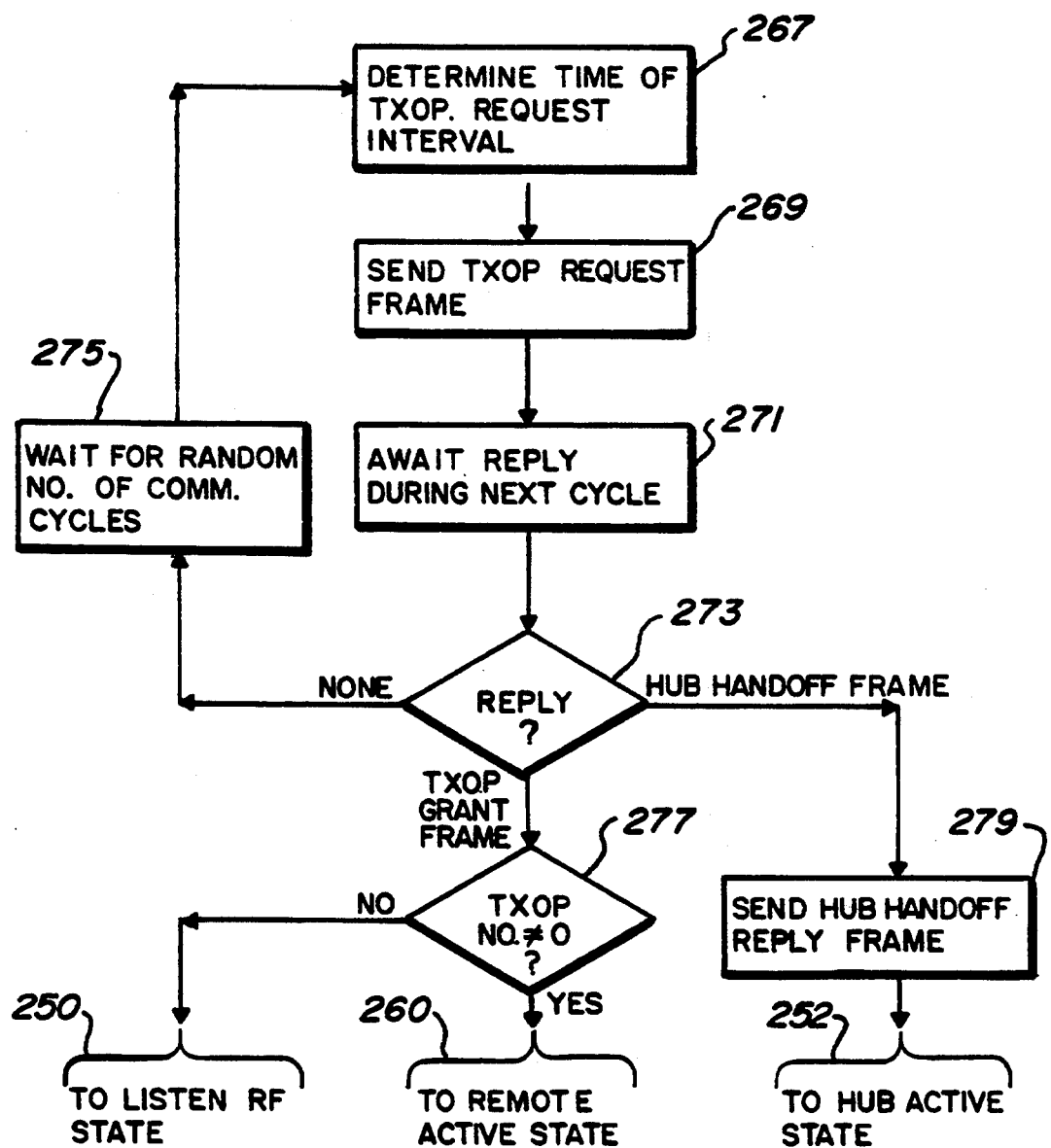
Fig_17

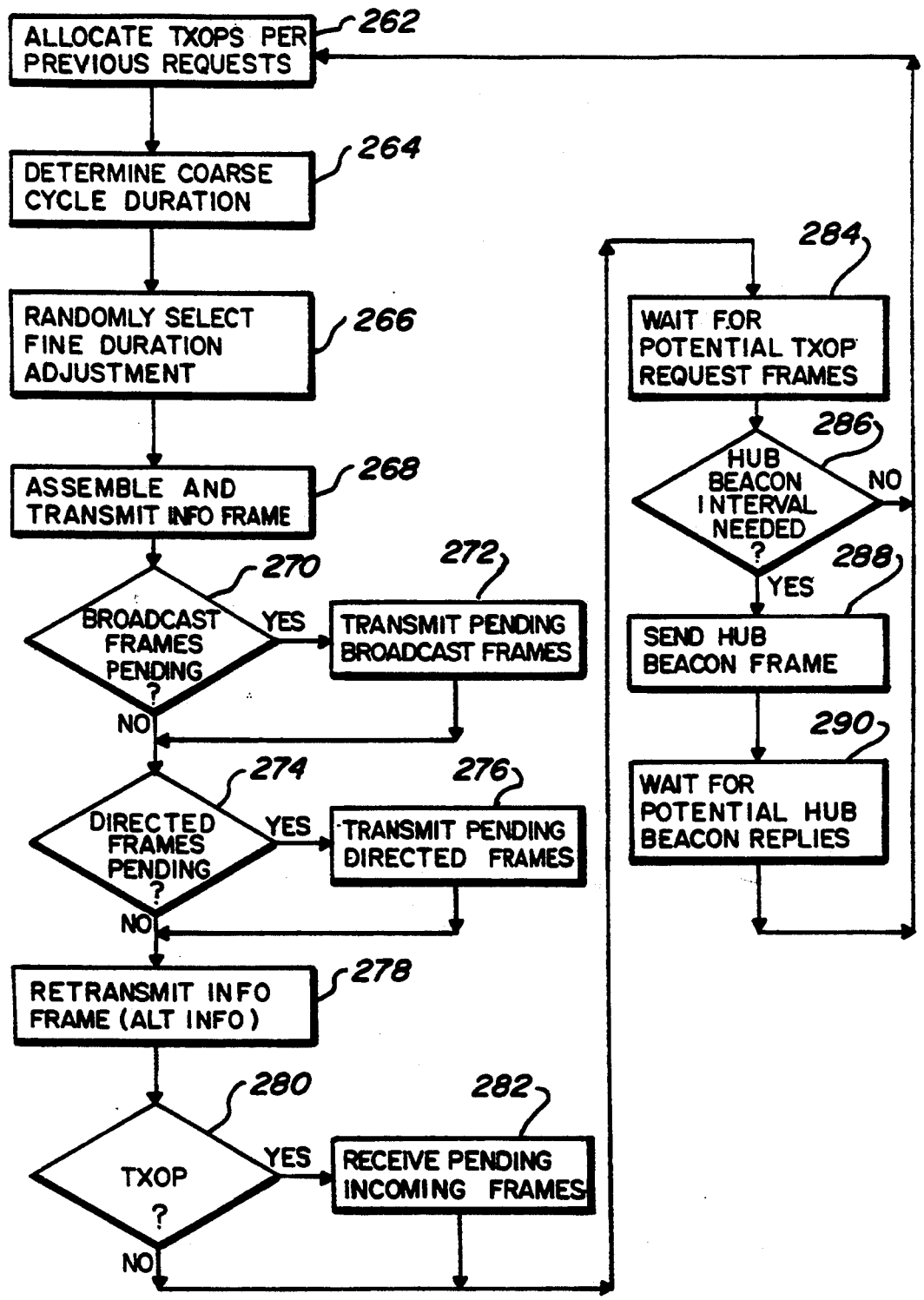
Fig_18

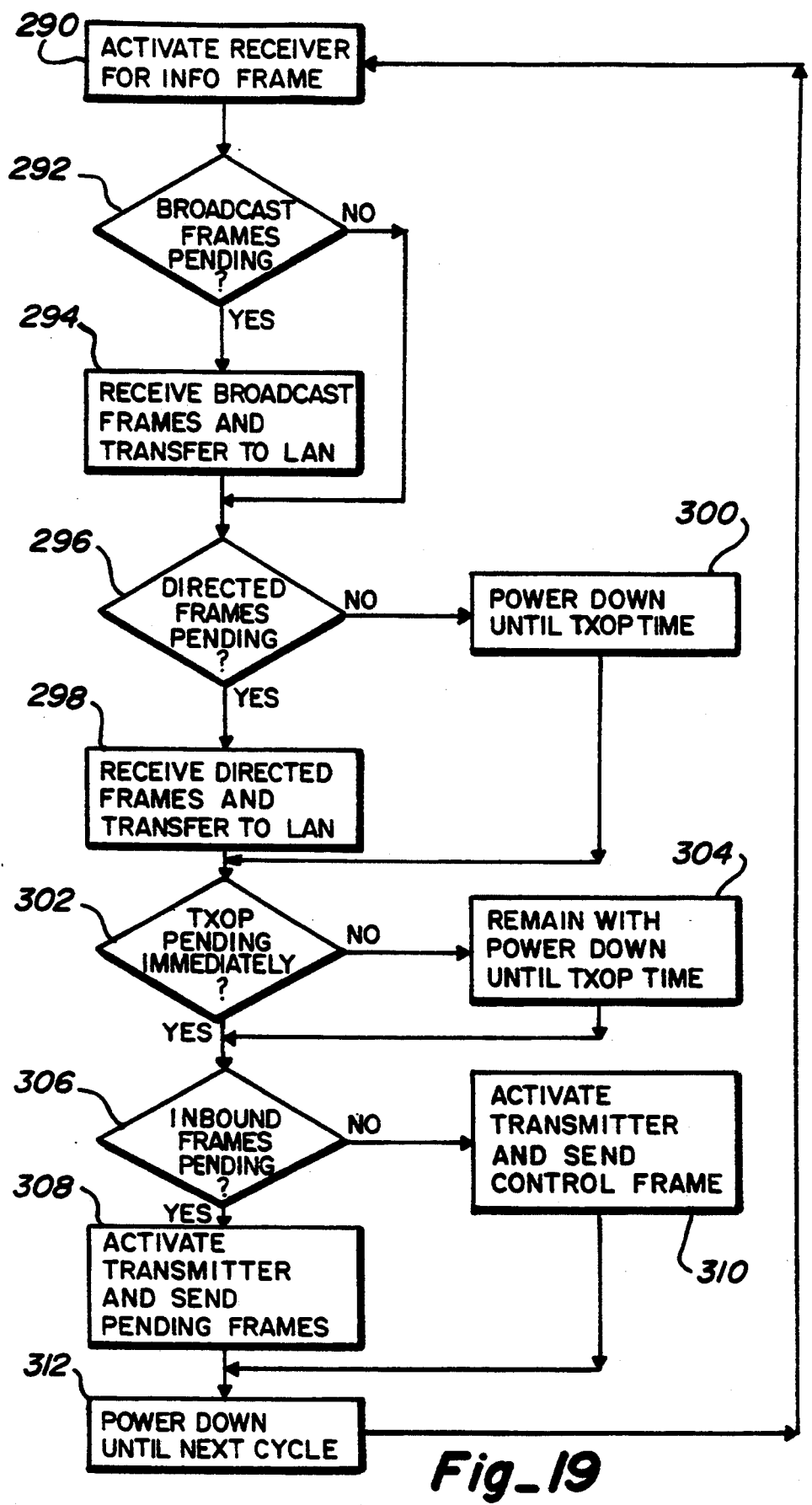
Fig_19

MEDIUM ACCESS CONTROL PROTOCOL FOR WIRELESS NETWORK

CROSS-REFERENCE TO RELATED APPLICATION

This invention relates to an invention for a Technique for Bridging Local Area Networks Having Non-Unique Node Addresses, Ser. No. 08/011,361, filed concurrently herewith, by the inventor hereof, and assigned to the assignee of this Application. The disclosure of this related invention is incorporated herein by this reference.

FIELD OF THE INVENTION

This invention relates to a technique and protocol for connecting multiple distinct computer resources by radio frequency (RF) or other wireless communications to establish a single logical network of the resources to permit communication between the distinct resources similar to that of a local area network (LAN). Even more specifically, the present invention relates to a medium access control (MAC) technique or protocol for selectively activating and deactivating the transmitters and receivers of the means for communicating between the resources to save electrical power consumed while still permitting LAN-like functionality, thereby extending considerably the ability of the resources to remain operable when battery powered.

BACKGROUND OF THE INVENTION

A LAN is a well-known means of achieving communication between different resources, typically computer resources such as computers, work stations, printers and the like. The LAN itself includes a network interface connected to each resource and a physical communication medium connecting all of the interfaces. The interface and connected resource constitute a node. Each node has an unambiguous address or identification (ID). Communication between nodes is typically accomplished by sending and receiving an ordered Group of bits known as a frame or packet. Each frame is sent from a source node, and is received by a destination node. The ID of the source node (SID) and the ID of the destination node (DID) are frequently included within the frame in Groups of sequential bits known as fields. The technique of communicating between the nodes, and of controlling the composition of frames, is defined by a network protocol.

The network protocol includes a MAC aspect which establishes an orderly and predictable ability of each node to access the medium, for the purposes of communicating with another node by transmitting and receiving frames, of requesting access to the medium and acknowledging previous frame communication. Without an orderly and predictable MAC technique, chaotic and inefficient communication, if any, would prevail, because it is highly unlikely that the frames sent from the source node would reach the destination node without interference and disruption caused by conflicting frames sent by another node at the same or overlapping time periods or at a time that the destination node was not ready to receive a frame. Therefore, the MAC facilities are one of the very important aspects of any LAN-like communication protocol among a plurality of equal peer-type transmitting and receiving stations such as nodes.

Because of the increasing recognition of the benefits of communicating information quickly between resources and of sharing resources in computational situations, LANs and networking in general are becoming widely used. Networking of personal computers and work stations allows for easy and effective communication and exchange of information between computers, as well as cost effective sharing of computer resources such as hard disks and printers.

Implementing a LAN can present a significant impediment when it is recognized that all of the resources must me wired together, particularly if the resources are physically separated and numerous. It is not unusual that many thousands or tens of thousands of feet or meters of cable may be required to connect a few tens or hundreds of resources, even when none of the resources is separated by more than a few hundreds of feet or meters. In existing facilities, sufficient physical access may not be available to route the necessary cabling. Installation, even if possible, may be very expensive. Even in designing and constructing new facilities, the cable expense itself for networking among a large number of personal computers or work stations may be cost-prohibitive.

Networks of LAN-like functionality have been established in the past by implementing the communication medium with wireless RF links between the resources. One difficulty presented by such systems is that MAC becomes considerably more difficult, because the RF links do not permit the transmitting and receiving stations (akin to nodes on a LAN) to sense the use of the medium (the RF signals) as reliably as in a wired network. Timing and synchronization requirements for the transmission of messages, static and interference from sources of RF noise, transmission and reception range limitations, multipath interference and fading and other known difficulties, all become significant concerns and limitations in implementing MAC protocols for wireless networks. These same concerns are generally not regarded as highly significant in wired or optical fiber networks because the integrity of the cabled medium usually avoids most if not all of these concerns. The integrity of the wired communication medium usually eliminates or significantly reduces the concerns about interference because the cabling offers inherent shielding from interference. Because the integrity of the communication is essentially assured in transmissions over the wires, range and signalling issues generally do not become significant. Light links have also been employed in networks, but the difficulties with light linked networks are usually even more exaggerated because of the directionality required for directing light beams in unobstructed, line-of-sight, signal paths.

To make the communications more reliable by avoiding many of the problems caused by the difficulties associated with the wireless medium, a variety of different MAC techniques have been employed in wireless network systems. In general the objective of these MAC techniques has been to add reliability to the communication process by compensating, to a certain degree, for the greater uncertainties associated with the wireless medium.

One of the most widely used MAC techniques, originally developed for wireless network systems, but now employed for several of the most common wired network standards, is referred to as carrier-sense multiple access (CSMA). In CSMA, each station uses its receiver to monitor the network medium for other transmission activity prior to activating its transmitter. If any such activity is detected, the station waits until a predetermined time after the end of the detected network activity. If two or more stations begin transmitting at close enough to the same point in time so that none of these stations detect each other's transmission, the resulting transmissions are said to collide, with the result that none of the frames being transmitted by these stations are able to be successfully received at their intended destinations.

While CSMA protocols offer very low latency to begin communication during periods when little or no other network message traffic is active, they perform poorly when many stations are contending for access to the medium to send frames or when the aggregate amount to be transmitted exceeds about half of the data bandwidth of the network medium. In addition to this problem with saturation at well below the rated capacity of the network, wireless CSMA networks have increased chances for collisions when compared with wired CSMA networks, because obstructions to RF signal propagation could permit a station to erroneously detect an available network medium, allowing that station to activate its transmitter while another station was in the process of sending a frame.

Another MAC technique which is typically used in wireless networks is referred to as time division multiple access (TDMA). In TDMA, the available time for the multiplicity of the stations to access and use the radio links is divided among each of the stations. Each station has its own predesignated and assigned time Txop for communicating RF messages with other stations. Each station recognizes and operates under recognition of the order and sequence of the time Txops assigned to the other stations, to avoid overlap and conflict in the communications.

While TDMA protocols are generally very effective in providing reliably recognized opportunities for communicating messages, they can result in a reduced capacity or data bandwidth for transmitting information between stations when the communications are intermittent quantities of variable length messages ("bursts"). In burst message situations, which are highly typical of LAN-type communications, TDMA results in reduced useable data bandwidth because a large portion of the available time is unused for data communications because that time is assigned to stations that have nothing to send when their time slots occur. In situations where one station may have a considerable amount to send, the information must be broken up into parts and sent in sequence, one part each time the station's time occurs. Thus, TDMA, while providing reliable medium access in the difficult medium access environment of wireless networks, does not provide the higher message throughput or bandwidth as do some of the more traditional LANs.

Another MAC technique which is typically used in wireless networks is referred to as packet reservation multiple access (PRMA). In PRMA, each of the multiplicity of the stations must request and reserve a time to access and use the radio link to send its packets or frames. The requests are made on the basis of the amount of time that each station expects to use in communicating the amount of information it has queued for delivery to another station. The available time for all the stations to communicate is divided among each of the stations according to the requests of the stations. The time allocation reserved for each station is communicated to all of the stations, so all of the stations recognize which stations have a time allocation, how long the time allocation is and in what order the stations will receive and use their allocations. After this information is conveyed, each station requesting time uses its reserved time in its assigned order to communicate packets or frames with other stations.

PRMA techniques are more effective than TDMA techniques in utilizing the available time, because only those stations with messages to send need to be provided with an opportunity to send messages. However, fast response to requests is impossible because of the delays inherent in obtaining a reservation. A considerable amount of the available time is consumed in the rather complex communication of control information, referred to as "overhead." The overhead is used for requesting time, allocating a reservation of time, communicating the amount of time reserved, communicating the order in which the stations receive the time reservations, and the like. As a consequence, the quantity of useful data bandwidth of PRMA networks is also limited.

Another recent development in the field of computing is the increasing proliferation of battery-powered, portable computers. These portable computers allow computational tasks to be performed wherever the user happens to be located. Portable computers are usually used during travel, because portability is their primary advantage. Even during travel, however, there may be a need to access other computer resources through the portable computer, just as is more typically done with stationary resources. It may desirable to create temporary, ad hoc networks of portable computers so that, for example, users can network their portable computers to exchange data in meetings and classrooms. Of course in these situations, physically connecting the portable computers to a wired network medium may be inconvenient or impossible. In addition, the users and their locations may not be specifically predefined, and may change intermittently. In addition, to connect portable computers with RF or other wireless networking capability, it is necessary that the transmitters and receivers also operate from battery power, otherwise one of the primary benefits of wireless networking is negated by requiring the use of a power wire instead of a network medium wire. The additional power drain resulting from operating the transmitters and receivers diminishes the available power for the portable computer. If separate batteries are employed for the transmitter and receiver on one hand and for the portable computer on the other hand, the batteries for the transmitter and receiver should be able to provide as much longevity of use for the transmitter and receiver as the batteries for the portable computer provide, without being so large or heavy as to interfere with portability.

A major obstacle to adequate battery life for battery-operated wireless network interfaces is that conventional MAC protocols, whether using CSMA techniques, TDMA techniques, PRMA techniques, or other techniques (such as token passing), all assume that the network receivers are capable of receiving frames at all times that they are not actively transmitting. Consequently these MAC prior techniques are concerned only with controlling access to the network medium by transmitters. Because low-power, short-distance radio transceivers consume about as much electrical power in their receiving function as in their transmitting function, a useful protocol for battery operated networking must avoid this assumption, and must concern itself with the access to the network medium by the receivers as well as the transmitters.

It is against this background that the significant improvements and advancements of the present invention have evolved.

SUMMARY OF THE INVENTION

It is the overall objective of the present invention to provide a reliable medium access control (MAC) protocol for wireless, preferably radio frequency (RF), LAN-type network communications among a plurality of resources, such a battery powered portable computers. The MAC protocol of the present invention provides the reliable, predictable aspects of medium access similar to those obtained in TDMA, and also provides the more effective allocation of available bandwidth among those resources which have messages to send, similar to those available from PRMA. In addition, the MAC protocol of the present invention avoids many of the disadvantages associated with the inefficiencies of LAN-type burst communications in TDMA, the high overhead requirements for communications in PRMA, and the problems of avoiding collisions and saturation that affect CSMA. Further still, the present invention provides a MAC protocol which may be very effectively implemented with communicator stations used with portable computers, because it obtains significant reductions in battery power drain by permitting the receivers as well as the transmitters of the communicator stations to be powered off during a majority of the time, but selectively and predictably powered on to send or receive relevant communications.

In accordance with these and other aspects, a communicator station or communicator wirelessly transmits frames to and receives frames from a least one additional communicator in accordance with a predetermined MAC protocol. Each communicator includes a transmitter and a receiver. The communication occurs among members of a Group of communicators. The MAC protocol controls each communicator of the Group. One of the communicators of the Group is designated as a "hub" and the remaining communicators are designated as "remotes". The hub establishes repeating communication cycles, each of which has intervals during which the hub and the remotes transmit and receive frames. The hub transmits control information to the remotes to establish the communication cycle and to establish a plurality of predeterminable intervals during each communication cycle. These intervals allow the hub to transmit frames to the remotes, allow the remotes to transmit frames to the hub, and allow each remote to anticipate receiving frames from the hub. Due to the defined intervals of the communication cycle and the information conveyed by the hub, the remotes are able to power off their transmitters during times other than those intervals when the remote is allowed to transmit frames to the hub. In addition, and very significantly, the remotes are able to power off their receivers during times other than those intervals when the remote is expected to receive frames from the hub. Thus, the control information and the communication cycle conserve considerable power because the receivers and transmitters of the remotes may remain powered off for a considerable portion of time without degrading communications.

Another desirable aspect of the MAC protocol of the present invention is that the hub allocates transmission opportunities (Txops) to the remotes, preferably based on bandwidth requests from the hubs. Txop allocation information is communicated to the remotes. Previous Txop allocations may be revoked or relinquished for non-use or very low use as determined by the hub monitoring the frames transmitted by each remote, for example. In addition the Txop allocations may be varied or adjusted by the hub from one communication cycle to the next to account for changes in activity of the remotes. The adjustment occurs in relation to the number of frames or quantity of data transmitted by each remote during recent communication cycles. Thus, the desirable aspects of TDMA are achieved by providing specific predeterminable intervals for Txops, and the desirable aspects of PRMA are achieved by adjusting the durations of the Txops to accommodate the communication of the more active remotes. Battery power concerns are addressed by allowing the predeterminable intervals for receiving frames, thus allowing the receivers to be powered off until the frames are anticipated.

Another aspect of the MAC protocol of the present invention involves conveying a variety of beneficial information concerning the communication cycle to the remotes, preferably at the beginning of each communication cycle, to achieve numerous other improvements. The hub transmits information to the remotes in a manner which does not incur a high overhead penalty. The hub preferably adjusts the length of a communication cycle relative to the length of a previous communication cycle to avoid some of the problems of interference from sources of periodic noise. The hub preferably transmits the information to the remotes twice during each communication cycle to reduce the possibility of a remote failing to receive the information during any communication cycle. Each remote preferably has the ability to select one among the plurality of antennas with which to receive RF signals during each communication cycle based on the strength of the received signal, preferably during a preamble portion of a transfer unit from the hub which includes the information. Preferably, the RF signals employ direct sequence spread spectrum modulation and demodulation established by a predetermined spreading code set by the hub to more effectively achieve good communication. The hub and a newly active remote also exchange operating characteristic information to allow negotiation of which communicator would better serve as a hub for the Group. The operational responsibility as the hub is preferably transferable from one communicator to another. Adjacent hubs of different Groups also communicate to adjust their operating characteristics and those of the remotes in their Groups to avoid conflicts in transmissions. The remotes also transmit transfer units that contain information describing the frames that were successfully received during a pervious communication cycle to allow retransmission of the frames unsuccessfully received without having to retransmit all of the frames. These are examples of a few of the many improvements available from the present invention.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a block diagram of a Group of wired LAN segments bridged together by RF communications between communicators connected to each LAN segment in accordance with the present invention.

FIG. 2 is a block diagram similar to FIG. 1 showing the relative RF transmission ranges of a hub communicator of the Group shown in FIG. 1, and some of the other remote communicators of the Group, shown in FIG. 1.

FIG. 3 is an illustration of a communication cycle established by the hub communicator shown in FIGS. 1 and 2 to control outbound signal transmissions from the hub communicator to the remote communicators of the Group and to control inbound signal transmissions from the remote communicators to the hub communicator of the Group.

FIG. 4 is a block diagram of a communicator shown in FIGS. 1 and 2.

FIG. 5 is a block diagram of a RF modem of the communicator shown in FIG. 4.

FIG. 6 is a diagram showing components of a transfer unit which is communicated between communicators as shown in FIG. 1.

FIG. 7 is an expanded diagram of a payload of the transfer unit shown in FIG. 6.

FIG. 8 is an expanded diagram of a frame which forms a portion of the payload shown in FIG. 7.

FIG. 9 is an expanded diagram of fields of a header of the frame shown in FIG. 8.

FIG. 10 is a diagram showing the intervals occurring during an outbound portion and an inbound portion of the communication cycle shown in FIG. 3.

FIG. 11 is an expanded diagram of a portion of FIG. 10, showing transfer units and frames transmitted during the outbound portion of the communication cycle.

FIG. 12 is an expanded diagram of a portion of FIG. 10, showing the transfer units and frames transmitted by the remote communicators during their allocated transmission opportunities (Txops) in the inbound interval of the communication cycle.

FIG. 13 is an expanded diagram of a transfer unit and a frame sent by a remote communicator to the hub communicator to obtain a Txop allocation in the communication cycle.

FIG. 14 is an expanded diagram of exemplary transfer units and frames sent by hub communicators of adjacent Groups during a hub beacon interval of the communication cycle.

FIG. 15 is an operational state diagram showing the operation of the communicators shown in FIG. 1.

FIG. 16 is a flow chart of the operations occurring during listen RF active state of operation shown in FIG. 15.

FIG. 17 is a flow chart of the operations occurring during a request Txop state of operation shown in FIG. 15.

FIG. 18 is a flow chart of the operations occurring during hub communicator active state of operation shown in FIG. 15.

FIG. 19 is a flow chart of the operations occurring during remote communicator active state of operation shown in FIG. 15.

DETAILED DESCRIPTION

A plurality of LAN segments which may be bridged in accordance with the present invention are shown in FIG. 1 and referenced at 30a, 30b, 30c, 30d, 30e and 30f. LAN segments generally will hereinafter be referred to by the reference number 30, while specific LAN segments shown in FIG. 1 will be referenced by an alphabetical identification in conjunction with the reference numeral 30 as shown. Each LAN segment 30 is in actuality a LAN or at least one node of LAN. Each LAN segment 30 includes a physical communication medium 32 which connects nodes 34 of each LAN segment 30 in a network topology (bus, ring, star, etc.) which is illustrated as a bus in FIG. 1 for simplicity. The communication medium 32 will typically take the form of electrical connectors interconnecting the nodes 34, but may also include radiant energy links, such as modulated light links, as are known to be employed in LANs.

Each node 34 comprises a network interface 36 connected to the communication medium 32, and one or more resources 38 connected to the interface at each node 34. The resource 38 can assume a variety of different configurations, as is known, but will typically include a computer such as a work station, portable computer, personal computer, printer, server, or the like.

Communication between separate nodes 34 and the resources 38 on those LAN segments 30 which have multiple nodes 34 and resources 38, such as LAN segments 30a, 30b and 30e, is accomplished in accordance with a network protocol which governs the transmission and receipt of communications, known as LAN packets, over the medium 32 linking the interfaces of the nodes 34. The communication actually is undertaken by the interfaces 36 transmitting and receiving the LAN packets over the communication medium 32 to establish communication between the nodes 34. The form of the LAN packets is also controlled by the network protocol which governs the communications over the LAN segments 30.

To allow orderly and reliable communication between the nodes 34, each node 34 has its own node address or NID. The NID of each node 34 is maintained by the interface 36 associated with the node. As shown in FIG. 1, exemplary NIDs for each node are illustrated enclosed within circles within the rectangles designating each node 34. The LAN packets transmitted from a source node typically contain the address of the source node (SID) sending the packet, and the address of the destination node (DID) to which the packet is addressed, in accordance with the typical network protocol.

Some of the LAN segments, i.e. 30c, 30d and 30f, are single resource, single node LAN segments. Thus, it is impossible to communicate between nodes on those LAN segments because two active nodes, a source node and a destination node, are required for LAN packet communication, and two nodes do not exist on those LAN segments. The other LAN segments, i.e. 30a, 30b and 30e, permit LAN functionality between the nodes 34, because each LAN segment contains at least two nodes 34. The preferred embodiment uses the RF MAC protocol for bridging between LAN segments, however the MAC protocol of the present invention is for communication between RF nodes. In alternate embodiments, the communicator function 60 can also be used directly as a LAN adapter, replacing the interfaces 36 of the PC or other resources 38.

One capability of the present invention is to bridge together the LAN segments 30, whether single node LAN segments (30b, 30c and 30f) or multiple node LAN segments (30a, 30b and 30e) so that all of the nodes 34, regardless of the type of LAN segment 30 upon which they appear, can achieve effective LAN like communication among a "Group" of separate LAN segments. The number of LAN segments which can be bridged is preferably limited to a predetermined number, for example sixteen. The communications between the LAN segments will be transparent to the network interfaces 36 and without altering the protocol used on any of the LAN segments 30. In essence, the bridged LAN segments 30 establish a single logical LAN.

To bridge the LAN segments 30 together for effective communication between the nodes 34, communicator stations or communicators 60a, 60b, 60c, 60d, 60e and 60f are connected to each LAN segment 30a, 30b, 30c, 30d, 30e and 30f, respectively, as is shown in FIG. 1. Each communicator will hereinafter be generally referred to by the reference number 60, while specific communicators shown in FIG. 1 will be referenced by an alphabetical identification in conjunction with the referenced numeral 60 as shown.

Another more general capability of the present invention is to serve as a self-contained, wireless network or LAN, with the communicators attached directly to the resources 38, in place of the wired LAN segments 32 and the associated interfaces 36. In this more general usage, the communicators directly connect to a resource and convey LAN packets or other information using the MAC protocol of the present invention, and no bridging between separate LAN segments occurs. It should be understood that the MAC protocol of the present invention is equally applicable to either situation.

Each communicator 60 communicates with the node or nodes 34 on the LAN segment 30 (or resource 38) to which it is locally attached. A "local" node or a "local" LAN segment or resource is the one which is directly connected by the communication medium 32 to the communicator 60 with regard to which the reference "local" is made.

Each communicator 60 preferably includes a LAN interface 36. The interfaces 36 in the nodes 34 and in the communicator 60 are the same, and they operate in accordance with the same network protocol. Communications over the local LAN segment between communicator 60 and each node 34 occur through the interfaces 36 and the communication medium 32 in accordance with the network protocol, just the same as communications between two nodes 34 on a local LAN segment. Because the interfaces 36 associated with the communicators 60 communicate with the interfaces 36 associated with the nodes 34 under the same protocol, the interfaces 36 associated with the communicators 60 must have an NID like the other LAN interfaces 36. However, the communicators 60 are not nodes 34, as that term is used to describe LAN functionality, because the communicator 60 achieves the administrative functions associated with bridging instead of the usual information processing functions associated with a resource 38. In the embodiment wherein the communicators 60 attach directly to the resources 38, the communicators 60 do function as nodes on the wireless network, and this RF network serves as the LAN, so there are not separate LAN interfaces 36 nor LAN NIDs.

To bridge the LAN segments 30, the communicators 60 transmit and receive radio frequency (RF) signals known as "frames." The communicator 60 which sends a frame is referred to as a transmitter communicator or "transmitter," and the communicator 60 (or communicators in the case of broadcast or multicast frames) which receives the frame is a receiver communicator or "receiver." Each frame is formed by a digital bit stream containing information and/or data to accomplish the bridging functions, the LAN functions and/or the MAC protocol aspects of the present invention described below.

The number of communicators in the Group may depend on their radio transmission range. The range may be limited due to government regulations limiting the amount of the power of the transmitted RF signal, by obstacles and obstructions which may block or attenuate the RF signals, and/or by interference from other, nearby transmitters, for example. Accordingly, all of the communicators may be unable to establish direct RF communications with one another. For example, in the arrangement shown in FIG. 2, the communicator 60a is not within the transmission range of the communicator 60d, since the transmission range of the communicators 60a and 60d are represented by the circles 62a and 62d, respectively. Each communicator's transmission range will hereinafter be generally referred to by the reference number 62, while specific communicator transmission ranges shown in FIG. 2 will be referenced by an alphabetical identification in conjunction with the referenced numeral 62 as shown. Therefore, direct communications between the communicators 60a and 60d are not possible. However, under the MAC protocol technique of the present invention, all of the communicators of the Group need not be within range of every communicator in the Group in order to obtain effective communication.

In order to expand the transmission area beyond the transmission range of any particular communicator 60, one of the communicators 60 will function as a hub communicator or "hub" 64. The hub 64 will act as a central receiver for the communications transmitted among the other communicators 60 of the Group. The communicators 60 other than the hub 64 are designated as remote communicators or "remotes" 66. In addition to functioning as central receiver, the hub 64 also functions as a central relay station for relaying transmissions between the remote communicators 66 and for receiving messages from the remotes 66. As shown in FIG. 2, because both communicators 60c and 60f are within range of all the other communicators 60a, 60b, 60d and 60e, either would be a suitable choice for the hub 64 from the standpoint of communications range. However, in the situation where more than one communicator might adequately serve as a hub from the standpoint of transmission range, other factors (described below) determine allocation of hub status. In the example shown in Fib. 2, communicator 60f has been designated as the hub 64.

Thus, because of its central location, the hub 64 will be able to receive and relay transmissions from all the communicators 60a, 60b, 60c, 60d and 60e achieving communications between all communicators 60, including those which are not within range of each other for point-to-point or direct communications, such as communicators 60a and 60d. In receiving and relaying all transmission in the Group of communicators 60, the hub 64 allows for the single logical network to be larger than the transmission range 62 of a single communicator 60. The remotes 66 need not be within transmission range 62 of each other to communicate as long as the remotes 66 are within transmission range of the hub 64.

As shown in FIG. 2, the single logical network formed by the hub 64 and the remotes 66 represents a topology which is both a logical and a physical star. The physical star is found by the remotes 66 arranged around the more central hub 64, which permits the single logical network of a physical size greater than the transmission range of any one of the communicators in the Group. The logical star results from the individual communication paths between the hub and each of the remotes. Signals are transmitted from the hub to all of the remotes, and from each of the remotes to the hub. The logical communication path for all of the transmissions is to or through the hub, thereby establishing the star topology. The physical layer of the seven layer ISO reference model for data communications is represented by this logical and physical star topology. All physical layer communications are either bilateral transmissions between a remote 66 and a hub 64, bilateral transmissions between a hub 64 and a remote 66, or broadcast transmissions from the hub 64 to all remotes 66.

The operation of the communicators emulates the characteristics of a logical bus as viewed from above the link layer of the media access control (MAC) sublayer of the link layer of the seven layer ISO reference model for data communications. However, the physical and MAC layer functions are implemented using the star topology.

To achieve the MAC sublayer functionality, the hub 64 controls the communications to and from the remotes, using a MAC protocol according to the present invention. The foundation for this MAC protocol is allocation of media access for transmission (e.g. the right to energize the RF transmitters at the respective communicators) at appropriate, non-overlapping times and media access for reception (e.g. the need to energize the RF receivers at respective communicators), at appropriate times that RF frames may need to be received. These times, referred to as transmission opportunities (Txops), are controlled in the context of a communication cycle 70, shown in FIG. 3, which the hub establishes and which is repeated on a continuous basis as long as the hub is active. In contrast to conventional MAC protocols, the present invention is concerned with media access for reception as well as for transmission. The hub governs the sequence of its own frames which are contained in transfer units, transmitted outbound from the hub 64 to the remotes 66 during an outbound portion 72 of the communication cycle 70. The hub also controls the sequence and duration of frames which are contained in transfer units which are transmitted inbound from the remotes 66 to the hub 64 during an inbound portion 74 of the communication cycle. It is during the outbound portion 72 and inbound portion 74 of the communication cycle 70 that all frames are communicated.

During the outbound portion 72 of the communication cycle, as shown in FIG. 3, there is an initial information (info) interval 76 during which the hub 64 transmits control and other information to the remotes 66. This information allows each of the remotes 66 to recognize and participate in the communication cycle at the predetermined times. A broadcast interval 78 is also included in the outbound portion 72 to allow the hub 64 to broadcast the same information to all of the remotes 66 in the Group, using a single transmission that is expected to be received simultaneously by all remotes 66. A directed packet interval 80 is also provided to allow the hub 64 to transmit frames to specifically identified remotes 66 in the Group. Because of the importance of the information communicated during the initial information interval 76, the information communicated in the initial information interval 76 is repeated in an alternative information (alt info) interval 82. By repeating the transmission of the control information in the alternative information interval 82, the chance for the remotes 66 to lose the synchronized nature of operation with the hub 64 is substantially diminished. In addition, during the information intervals 76 and 82, frames previously transmitted from the remotes to the hub during the inbound portion of previous communication cycle are acknowledged by the hub.

During the inbound portion 74 of the communication cycle 70, those remotes 66 which have requested a transmission opportunity (Txop) to transmit messages to the hub 64 are provided with an opportunity to do so. Generally, the hub 64 allocates to each remote 66 requesting one a Txop 84. The Txop 84, simply is a position in the order of other remotes 66 which have requested Txops 84 to transmit to the hub 64. The Txop is an amount of time during which the remote may transmit one or more frames to the hub. The Txops 84 are preferably allocated to the remotes 66 by the hub 64 in a predetermined order, and the hub may also vary the time durations of the allocated Txops 84, without varying their order. All remotes receive a Txop 84 with (at least) a predefined minimum duration on each communication cycle 70, whether or not they have any frames to transmit. The hub may adjust the duration of the Txops 86 by observing traffic patterns and in accordance with information received from each remote 66 relating to the amount of information which each remote has queued for transmission, among other factors. Besides using the allocated Txop to transmit frames from a remote 66 to the hub 64, the remote also acknowledges any directed frames communicated to it from the hub 64 during the communication cycle. If there is one or more outgoing frame, the remote 66 may "piggyback" these acknowledgements with these outgoing frames. In addition, if the Txop 84 is not used by the remote 66 for a predefined number of communication cycles 74, the hub 64 may determine that it is not necessary to preserve a Txop for a particular remote 66, and thereafter cancel the Txop 84 allotted to that remote 66.

After the series of Txops 84 are allocated, a Txop request interval 88 is provided. During the Txop request interval, communicators 60 which have recently joined the Group, or communicators 60 which have not previously been allocated Txops 84 in which to transmit messages are allowed to transmit messages to the hub 64 requesting that they be allocated a Txop. Upon receipt of the Txop request, the hub 64 will allocate a Txop 84, if any are available. The hub 64 will inform the requesting remote (and all other remotes) of this Txop allocation in the information intervals 76 and 82 of the next communication cycle. This dynamic allocation of Txops 84 is particularly beneficial in situations where portable communicators move into and out of range of the Group's hub at arbitrary times, and should neither burden the available aggregate bandwidth of the Group with an unused Txop when it is not present nor require user intervention when it rejoins the Group.

Thus the communication cycle 70 orders the transmission of communication control information to the remotes 66 (including acknowledgements to previous frames received from the remotes 66), allocates inbound Txops 84 in accordance with the amounts of transmission time requested by each remote (and other factors), transmits outbound frames (both broadcast and directed) to the remotes 66, and receives inbound frames from the remotes 66 pursuant to the previously-made Txop allocations. The remotes 66, in their allocated sequence of Txops 84, acknowledge previous frames received from the hub 64, and transmit inbound frames to the hub 64. In addition the remotes may request allocation of Txops when needed during the Txop request interval 86 of the inbound portion 74.

All intervals of the communication cycle 70 take place within the limits of predesignated assigned times established by the hub. Each interval is measured in terms of a number of basic time increments (BTIs) prespecified to all communicators in the Group. A BTI is a predefined unit of time (parameterized, default of 4 milliseconds, for example) that is the fundamental increment of communication cycle 70 time allocation, and is the metric by which intervals within the communication cycle 70 are measured. The hub 64 controls the duration and usage of the communication cycles 70. The time for the overall communication cycle 70, along with the specific interval allocations within the cycle 70, are broadcast by the hub 64 in during the information intervals 76 and 82 in the form of control information delivered in an information frame transmitted during the information interval 76.

Because all frames, both outbound and inbound, occur at predetermined times, the remotes 66 are able to determine in advance approximately when to expect frames transmitted from the hub and when to transmit frames to the hub. As a consequence of the predictable times when frames may be both received and transmitted, the remotes can power their radio interfaces down to preserve power at other times. Because radio circuits with radiated RF energy levels that comply with the rules in Part 15 of the FCC regulations consume about as much electrical power when receiving as when transmitting, this ability to power the radio off completely is a major benefit for battery-powered communicators. This MAC protocol control feature is of particular importance in facilitating portable computer attachment. When the remote battery-powered communicators are used, as would typically be the case when a personal, portable computer is the resource attached, this power down capability makes it possible to obtain an increase in useful battery life of over five times compared to the battery life if the radio interface was continuously powered for reception (or transmission).

The communication cycle features of the MAC protocol also provides efficient, low-latency support for typical LAN usage patterns, in which frame size distribution is strongly bimodal (one mode quite short, the other mode at or near the maximum frame size for that LAN protocol), and frame arrival rates are burst like (highly non-uniform, with shifting peak traffic locations). Only those communicators which transfer frames on a regular basis are regularly allocated Txops longer than one BTI, thereby reserving bandwidth for those more active remotes. In addition the relative allocation of the time among the remotes favors those which have requested and used more time for frame transmissions in the recent past, which again keeps with the shifting peak traffic patterns of LAN-like communications.

By controlling Txops in a timed sequence, the hub 64 serves a number of purposes, including: media access control, with specific Txops allocated to specific remotes; bandwidth allocation, in response to requests that indicate the amount of data awaiting transmission, thereby permitting adaptive allocations that favor the (dynamically changing) remotes 60 that have the most pending traffic; power management, as described; basic security, since each communicator 60 must be allocated a Txop before being able to participate in frame exchanges; MAC-layer frame acknowledgement (without a power consumption penalty), because acknowledgements can be piggybacked on subsequent frames with a known upper bound on the time delay from the original transmission attempt; and network administration, because all frames traverse the Group's hub 64.

Specific details concerning the communicators 60, the frames transmitted and received, the communication cycles and the functionality of the communicators in achieving the MAC protocol functionality of the present invention are described in greater detail below.

Details of the communicator 60 are shown in FIGS. 4 and 5. The communicator 60 combines radio hardware, interface hardware, and the necessary firmware to implement a transparent, wireless logical network between the communicators 60. The communicators preferably transmit and receive messages over a wireless physical layer provided by a direct-sequence, spread spectrum (DSSS) radio data link. A half-duplex, packet-oriented transfer medium is thereby established with sufficiently high data rate, sufficiently short transmit/receive turnaround time, sufficiently low power consumption and transceiver on/off speed, sufficiently low framing overhead requirements, and sufficiently high data reliability to support LAN-like operational characteristics between the separated LAN segments. Other packet-oriented, wireless data links that have adequate operational speed and related characteristics can be substituted for this DSSS radio link without changing the MAC protocol of the present invention. The communicator 60 also supports directly the logical-link control sublayer, network layer and all higher layers of communication, rendering the location-sensitive aspects of the wireless data link transparent to the attached resources. Each communicator 60 is not a node on the local LAN segment, but is a node on the wireless network.

The general nature of a communicator 60 is shown in FIG. 4. Each communicator 60 has a network interface 36, a microcontroller 90, a read only memory (ROM) 92, a random access memory (RAM) 94, and a RF modem 96, all of which are interconnected by a bus 98. The interface 36 is equivalent to that used by each node 34 on the LAN segments 30. The attachment of the interface 36 to the bus 98 and the microcontroller 90 is similar to that manner in which the interface 36 of a node 34 connects to its attached resource 38. The microcontroller 90, in its presently preferred form, is a Motorola 68HC16 microprocessor. The instructions controlling the operation of the microcontroller are stored as firmware in the ROM 92 and/or in software instructions in the RAM 94. These instructions implement the MAC protocol described herein. The RAM 94 contains a buffer to temporarily store information used when the communicator 60 is functioning. The information stored in the RAM 94 may be copies of LAN packets received from the interface 36 and awaiting transmission on the RF network, copies of frames received from the RF modem 96 and awaiting transmission on the LAN segment 30, or (for hub communicators) copies of frames received from one remote and addressed to another remote, awaiting transmission in an outbound interval of the communication cycle.

RF signals are transmitted to and received by the communicators at the RF modem 96. The RF modem 96 preferably has at least two antennas 100 and 102. The antennas are oriented in different configurations, to allow selection of the one which provides the best reception. Transmission of the signals usually does not require antenna selection, because signal transmission usually does not involve as many sensitive aspects as signal reception. At any physical location of a communicator, one of these antennas 100 or 102 is likely to offer better signal reception than the other. Selection of the best antenna is performed by software instructions in the RAM 94 as part of the signal acquisition process which the communicator 60 undertakes in conjunction with the receipt of RF frames. The time required to determine that the signal reception from one antenna is inadequate, and then to synchronize to the signal being received by the other antenna, is time during which transmissions cannot be successfully received by a communicator 60. Accordingly, the MAC protocol implementation involved in communicating the RF frames and the low-level radio control functionality in the microcontroller 90 cooperate to permit the selection of a better antenna.

The RF modem 96 accepts a digital data stream from the bus 98 at the transmitting communicator 60, produces and transmits the RF signal, and the RF modem 96 at the receiving communicator 60 receives the RF signal and produces a digital data stream corresponding to that supplied to the transmitting RF modem 96 (other than in the presence of errors due to RF interference or excessive RF signal attenuation). The transmitting and receiving RF modems 96 perform all of the necessary spreading, modulation, demodulation, and despreading functions to successfully transfer the frames between communicators. The transmitting RF modem 96 also generates a preamble at the beginning of each transfer unit (of one or more frames) that allows the receiving RF modem 96 to acquire and synchronize with the transmitted radio signal. However, all other data communication functions, including framing, formatting, address recognition, error detection, and link control, are imposed upon the physical layer digital data stream by the present invention at the MAC layer by non-RF modem hardware and microcontroller-based firmware of each communicator 60. At this MAC layer there is also a close interaction with the RF modem to achieve various control and calibration functions, including power consumption control, oscillator calibration and temperature compensation, receiver automatic gain control calibration, received signal acquisition, antenna selection for spatial diversity at the receiver; and transmitter power control (adaptive power management) associated with each communicator 60. Some of the calibration parameters provided by the RF modem 96 may also be used by the present invention for MAC layer control purposes, as well as by the RF modem 96 itself. In the preferred embodiment, the microcontroller 90 is also involved in processing the calibration parameters to calculate calibration responses to provide feedback to the radio.

The RF modem 96 in the preferred embodiment is a Model 100 DSSS RF Modem sold by Signal Technologies, Inc. of Longwood, Fla. The spread spectrum product operates a 191,176 baud, with a chip rate of 3.25 MHz at 17 chips per baud. The RF modem 96 is preferably programmed to operate on any or all four, non-overlapping frequency channels within the 902 to 928 MHz ISM frequency band defined by FCC rules. This RF modem 96 can support either binary phase-shift keying (BPSK), which achieves 1 bit/baud (for a data rate of 191 Kbps); or quadrature phase-shift keying (QPSK), which achieves 2 bits/baud (for a data rate of 382 Kbps). The BPSK functionally is identical to the QPSK functionality, other than for the data rate (half as fast), and synchronization time. The digital interfacing functions (spreading codes, etc.) and frequency synthesizer interfacing functions (frequency channels) are programmed in an identical manner for both BPSK and QPSK operation. One additional major difference concerns the calibration details, which must usually be separately established for each type of operation but in a manner that is independent of the MAC protocol that is the subject of the present invention.

The general nature of the RF modem 96 is shown in FIG. 5. The RF signals are transmitted from or received by antennas 100 and 102. A switch 103, controlled by the microcontroller 90, selects one of the (two or more) available antennas. The transmitted and received signals pass through a conventional RF filter 104. A selection switch 106 controls the signal path through the filter 104 and antennas 100 and 102. In one switch position illustrated in FIG. 5, signals are received. In the other switch position, the signals are transmitted. Preferably, the switch is a gallium arsenide field effect transistor (FET) switch. When not transmitting, the selection switch 106 is set to accept incoming signals.

With the selection switch 106 in the receive position, the received signals pass through the filter 104 and are applied to a low noise amplifier 108. The low noise amplifier 108 amplifies the signals and supplies them to another filter 110. The signals from the filter 110 are applied to a radio device 112 which performs both a radio receiving function as well as an amplifying function. Signals from the radio device 112 are applied to a coherent demodulator 114.

The coherent demodulator 114 extracts the base band data from the RF carrier signal which has been BPSK or QPSK modulated. The coherent demodulator 114 also functions as a coherent correlator for the spread spectrum sequence which modulates the data. A control signal for the coherent correlation or spread spectrum sequencing function is obtained from a spread spectrum controller 116. The coherent demodulator 114 includes a base band automatic gain circuit (AGC) which keeps the signal levels predictable when the AGC signal is applied to the radio device 112. The AGC circuit also forms part of a delay locked loop which interacts with the spread spectrum controller 116 during demodulation. A band gap reference signal is also supplied by the coherent demodulator 114 for use by other components. Since many of the signals in the coherent demodulator 114 are analog signals, the coherent demodulator 114 includes comparators to establish digital waveforms and provide in-phase and quadrature phase data outputs in a form compatible with the other digital components of the communicator. The coherent demodulator responds to the magnitudes of the in-phase, base-band and quadrature phase components of the received signal to establish a received signal strength indication (RSSI) signal representing the energy of the received demodulated signal. These signals are applied to the other components of the RF modem 96 to assist in achieving the functionality of those components.

In general, the functionality of the coherent demodulator 114 is conventional and appreciated by a person having skill in the field of signal communications. For convenience, all of these functions are readily available on a single commercial integrated circuit designated as CSL-100 available from Signal Technologies, Inc. of Longwood, Fla.

One of the important features of the spread spectrum controller 116, which results in beneficial message communication, is the ability to rapidly acquire and synchronize with incoming received signals. The shorter the time to acquire and synchronize adequately for correct demodulation, the smaller the portion of the frames that need be devoted to transmitting preamble signals necessary for synchronization, resulting in lower communication overhead and greater network efficiency. The ability of the spread spectrum controller 116 to quickly acquire and synchronize with received signals, may be advantageously achieved by employing the techniques described in U.S. Pat. No. 4,649,549. In the preferred embodiment, the spread spectrum controller 116 is a commercially available integrated circuit, having a designation AS-100, available from Signal Technologies, Inc. of Longwood, Fla.

In general, the components of the spread spectrum controller 116 include a timing distributor 118 which responds to a signal from an external clock oscillator 120 and distributes clock timing signals throughout the sections of the spread spectrum controller 116. One of the major sections of the spread spectrum controller 116 is an interface 122, which allows the exchange of control and data signals over the communicator bus 98 with the other components of the communicator 60. Internal program registers 124 allow settings to be recorded therein through the interface 122 to configure the functionality of the spread spectrum controller 116 in many respects, for example to establish the polynomial sequence used in spreading and despreading the signals, controlling certain other elements in the RF modem 96, selecting the type of modulation, maintenance functions and the like.

The interface 122 is connected to an internal bus 126, and most of other components of the controller 116 are also connected to the internal bus. A transmitter/receiver (Tx/Rx) power control 128 controls a number of elements within the RF modem 96 so that they can be properly power managed by selectively powering them down to save battery power, for example, if the communicator 60 is powered from a battery.

A spread spectrum generator and encoder 131 is a programmable device that allows for the implementation of a Galois polynomial sequence generator. An in phase, I-transversal filter 132 and a quadrature phase Q-transversal filter 134 receive signals from the spread spectrum generator and encoder 131 prior to RF modulation for transmission. For reception, a spread spectrum correlator and decoder 130 handles the demodulator 114 output to regenerate the unspread data. A baud synchronizer 136 allows a signal to be obtained which references to the data clock of the received data. The spread spectrum correlator and decoder 130 preferably employs the technology described in U.S. Pat. No. 4,649,549. A synthesizer interface 138 delivers signals to an RF synthesizer 140 which generates the various signals applied to the radio device 112 to down convert signals from the RF band and to up convert signals from the communicator 60 and spread spectrum controller 116, in the case of received signals or transmitted signals, respectively.

The spread spectrum controller 116 accepts data through the interface 122, translates the data from parallel to serial four and applies the appropriate spreading sequence to the data so that it becomes a base band spread spectrum signal. This information in spread spectrum form is applied to the radio transmitter 142 where it is converted to the appropriate RF band. The radio transmitter 142 applies the RF signal through the selection switch 106 and the filter 104 to the selected one of the antennas 100 and 102 where it is transmitted.

The communicators 60 dynamically perform frequency channel selection upon initialization, with the objective of minimizing interference between Groups that have overlapping RF communication spaces. If Groups are assembled using multiple hubs 64 which support inter-hub handoffs, the frequency channels may be statically assigned to each hub in order to provide repeatable handoff performance.

The present invention can be extended to provide wireless network communication for a wider physical area by providing a plurality of communicators predesignated as hubs all configured as part of the same Group and able to communicate with each other via a common (preferably high speed) wired "backbone" network. In the presence of such a multi-hub Group, a portable communicator that leaves the transmission space 62 of one hub of the Group, but entered the transmission space 62 of an adjacent hub in the Group (generally operating on a different frequency channel to avoid interference at the region of overlap) will detect the second hub during the attempt to detect an active hub after losing contact with the first hub. If this other hub is detected, by virtue of its being part of the same Group, and sharing a common backbone network over which the plurality of hubs can exchange LAN packets, the remote can remain in communication as part of the same logical network as soon as that remote has obtained a Txop allocation from the second hub. This type of microcellular functionality can be implemented upon the remote communicators attempting to re-establish communication with a hub (termed "passive handoff" because the hubs do not play an active role in the process) or by negotiation between the adjacent hubs when the RSSI level drops below a predetermined threshold (termed "negotiated handoff" because the hubs initiate the process of checking the relative signal strengths and determine the best destination hub for the handoff).

In the case of RF communication overlap between hubs 64 of different Groups that must operate on the same frequency channel, a technique must be employed to permit such hubs 64 to share the available RF bandwidth in an orderly manner, as is discussed below.

In applying the spreading sequence to the data, the RF modems 96 can be programmed to use any one of a large number of spreading sequences (for example several thousand spreading sequences), each of which is referred to as a code. All members of a Group of communicators 60 must be programmed to use the same code in order to achieve successful communication. Communicators 60 operating in the same RF communication space, and using the same frequency channel but a different spreading code than the Group members, cannot receive transmissions from other communicators of the Group, and transmissions by such other communicators may interfere with RF communication among the Group members. The potential for such interference can be reduced, but cannot be eliminated, by selection of spreading codes with adequate Hamming distance from each other. Accordingly, a limited subset of the available code space, for example 1000-4100 codes, selected based on appropriate Hamming distances, will be used to minimize the risk of inter-Group interference and to maximize the degree of communication security provided by the spreading.

The spreading sequence codes form the basis for a level of communications security because unless a communicator 60 is utilizing the appropriate code, it cannot participate in the communications. Certain codes may be also reserved for special network control and diagnostic purposes. The code usage is identified by code identification numbers that are used to index tables within the communicator ROM 92 or RAM 94 that contain the specific multi-byte sequences needed to program the RF modem to generate these codes.

The potential for interference between adjacent Groups is further reduced if each transmission by a communicator 60 uses the minimum level of RF energy required to achieve the needed signal strength at the designated receiving communicator 60. Reducing transmitted power may also improve the battery life of battery-powered communicators 60 by possibly consuming less power during typical transmissions. The ability to measure the received signal strength (RSS) at each end of a communication activity, plus the inclusion of a received signal strength indication (RSSI) parameter in certain frames communicated permits this type of adaptive management of transmitted power. Subsequent transmissions to a communicator that has reported excessively high RSSI values can be made using reduced transmit power. If RSSI levels are later reported to have dropped below a predetermined threshold, transmit power can be increased to compensate.

The digital data streams provided to the sending RF modem 96 are included in transfer units 144, one of which is illustrated in FIG. 6. The transfer unit 144 includes three components: a preamble 146, a payload 148 and a postamble 150.

The preamble 146 is a predetermined sequence of binary values which are used by receiving communicators 60 to acquire and synchronize to the incoming transmission. The preamble 146 provides the necessary amount of time with known information content for the demodulation and despreading functions of the RF modem 96 to acquire and synchronize with the signal prior to the beginning of the payload 148. In the preferred embodiment, the preamble 146 consists of a sequence of alternating ones and zeros lasting at least 1 millisecond.

The length of the preamble 146 may be defined separately for various types of transfer units 144. For transfer units 144 containing information frames, which are vital to maintaining the integrity of communications, a longer preamble 146 is generally used to provide a greater probability of acquiring the incoming signal, and to allow switching to the alternate antenna with enough preamble remaining to acquire and synchronize via the alternate antenna if RSSI levels through the first antenna prove insufficient. In addition, the preamble 146 for transfer units containing control information and hub beacon frames sent during the communication cycle is also generally longer than the minimum requirement to permit an alternate antenna to be selected midway through reception of the preamble 146 and still allow time for the RF modem 96 to synchronize to the signal using the alternate antenna. For transfer units 144 containing only normal data packet or bridge frames, a shorter preamble 146 is used because an error in a data packet frame will not impact communications to the same extent as an error in a control or information frame, and the use of longer preambles on such transfer units would increase network overhead. In the preferred embodiment, the default values for the length of the preamble 146 are 192 bytes for transfer units 144 containing information frames, 96 bytes for transfer units containing control frames, and 48 bytes for transfer units 144 containing neither control nor information frames. The preamble 146 is generated by the RF modem 96 of the transmitting communicator 60, is used by the RF modem 96 of the receiving communicator for signal acquisition and synchronization, and is detected and discarded by the microcontroller and its related circuitry of the receiving communicator 60.

The postamble 150 marks the end of the transfer unit 144, and provides time (with RF signal activity) following transmission of the payload 148 that may be needed for the receiving communicator to complete successful reception of the payload 148 prior to cessation of RF signal activity. The postamble 150 also provides a period of non-communication of sufficient duration to prevent destructive interference from overlap between transfer units 144 transmitted by different communicators. This non-communication period compensates for the allowable degree of timekeeping uncertainty that can accumulate between communicators 60 in the Group during any communication cycle 70. The postamble 150 is generated by firmware in the microcontroller 90 of the communicator 60, and its length is a predetermined constant to ensure a minimum separation between transfer units 144.

The payload 148 of the transfer unit 144 carries the substance of the communication. No restrictions are imposed by any of the components of the RF modems 96 on the contents or format of the payload 148. The payload 148 of each transfer unit, which is shown in FIG. 7, is a sequence of one or more frames. Frames are the fundamental data transfer entity of the present invention. Each transfer unit comprises one or more frames 152 separated by inter-frame gaps 154. The frames 152 contain the substantive information transmitted in the transfer unit. The number of frames in any transfer unit is limited by the lesser of the amount of information to be sent by the communicator 60, or for inbound communications from remotes 66 to the hub 64, the maximum amount of time allocated to the remote by the hub 64 for use as a Txop in the current communication cycle. If the allocated Txop is insufficient to send all queued, outgoing frames, some number of complete frames will remain unsent at the remote until another Txop occurs in a subsequent communication cycle 70. Frames 152 are never split up in different transfer units.

When multiple frames 152 are sent in a single transfer unit, these frames 152 are sent in direct succession, separated by inter-frame gaps (IFG) 154. The IFG 154 provides a sufficient amount of time for the receiving communicator 60 to complete handling of the preceding frame 152 and to prepare for receipt of the following frame 152. Each transfer unit thus contains an integral number of frames 152 and an integral number of IFGs 154 which is equal to one less than the number of frames 152. The IFG 154 is generated by the microcontroller 90 of the transmitting communicator 60 and is discarded by the microcontroller 90 of the receiving communicator 60.

Each frame 152 has the same basic format, one of which is shown in FIG. 8. Each frame is formed by five fields: a starting flag 160, a header 162, a body 164, an ending flag 166, and a cyclic redundancy check (CRC) 168.

The starting flag 160 is a unique bit pattern that identifies the beginning of a frame 152. The starting flag 160 is generated under firmware control of the transmitting communicator 60 during frame transmission, and is detected by firmware or hardware at the receiving communicator 60 during frame reception. In the preferred embodiment, the starting flag is unambiguous, so that no other sequence of bits in any transfer unit has the same pattern. This avoids the risk of commencing frame reception based on an arbitrary data byte in the middle of a body field. To achieve this in the preferred embodiment, the starting flag 160 is six ones, preceded and followed by a zero. This value is distinct from the preamble 146 (alternating ones and zeros), the postamble 150 (all zeros), the IFG 154 (all zeros) and the ending flag 166 (seven ones preceded by a zero). The uniqueness of the starting flag value is assured without restricting the use of any data values within the header 162 and body 164 fields of the frame 152 by "bit stuffing" within frames.

Bit stuffing is a technique that renders a predefined pattern of bits unambiguous by inserting bits at defined locations in an outgoing bit stream. The inserted bits prevent a predetermined bit pattern from occurring in locations other than those desired. Bit stuffing is commonly used, as it is in this situation, to render unique the delimiters of the frame boundaries. The portions of the frame 152 subject to bit stuffing in the frame shown in FIG. 8 are the header 162 and the body 164 fields. These fields are made unique by detecting when sequences of five or more one-bits that occur in the raw data that makes up these fields, and to insert ("stuff") a zero after any such sequence of five successive one-bits. In the preferred embodiment, the starting flag 160 and ending flag 166 include six and seven successive one bits, and because zero bits are stuffed after all other sequences of five successive ones in the other fields, the bit patterns of the starting flag 160 and ending flag 166 are unique within the transfer unit. In cases where variable amounts of transmission time are not desirable, a higher-overhead but fixed-length form of bit stuffing is to insert a zero bit after every fifth data bit in the header and body fields of the frame.

When bit stuffing is employed as part of frame transmission, "bit stripping" must be performed as part of frame reception. Bit stripping is the inverse operation to bit stuffing, thereby restoring the original bit pattern to the received data stream. Typically bit stuffing and bit stripping are collectively referred to simply as "bit stuffing." Bit stuffing is performed under control of the microcontroller 90 at the transmitting communicator 60 and bit stripping is performed under control of the microcontroller 90 at the receiving communicator 60.

The header 162 includes a number of fields which are described in conjunction with FIG. 9. The fields of the header contain several components of information which describe the structure and content of the frame 152.

As shown in FIG. 9, the first field in the header 162 is an organizationally-unique identifier (OUI) 172, which is three bytes in the preferred embodiment. The OUI 172 is a constant value which is globally unique to the manufacturer of the communicator 60 and is preferably the identifier assigned to that manufacturer by the IEEE project 802 for LAN standardization. The primary operational purpose of the OUI 172 is that its value can be treated as a constant for further qualifying the validity of frame reception, shortly after detection of the starting flag 160 (FIG. 8).

The OUI 172 is followed by a communicator destination address or identification (CDID) field 170 which specifies the communicator 60 to which the frame 152 is directed, or a predetermined bit pattern which signifies that the frame is a broadcast intended for all communicators 60. The CDID 170 is 3 bytes in the preferred embodiment. The address or identification (ID) of each communicator 60 may be uniquely established in many different ways, such as by allocating a unique serial number to each one manufactured.

The OUI 172 and the CDID 170 constitute a standard, 48-bit, IEEE 802 compatible network address. Because the OUI 172 is unique, if a frame 152 having an unanticipated OUI 172 or CDID 170 is received, the receiving communicator 60 is alerted that the transmission came from an invalid source and should be disregarded, or that there was a transmission error and the transmission should not be acknowledged so that the transmission will be repeated. In accordance with IEEE 802 address format rules, the low-order bit of the OUI is set to zero for directed frame addresses and is set to one for broadcasts and multicast addresses. When used in the preferred embodiment, multicasts are not needed and broadcasts are indicated by the low-order OUI bit set to one and the CDID set to all zeros.

The communicator source address or identification field (CSID) 174 follows the CDID 170, denoting the transmitting communicator 60. The CSID 174 contains the unique ID of the source or transmitting communicator 60 which sent the frame 152.

Next is a frame type field 176 which contains a code that identifies the usage of the information in the body 164 (FIG. 8) of the frame 152. Frames 152 received successfully that have unrecognized frame type codes are acknowledged by the receiving communicator 60, but the contents of the body 164 of such frames 152 are ignored. The types of frames 152 which valid codes in the frame type field 176 include, Txop request frames, Txop grant frames, Txop relinquish frames, initial or primary information frames, basic control frames (which have no body 164), alternate information frames, hub handoff request frames, hub handoff acknowledgment frames, hub beacon frames, hub beacon reply frames, data packet frames from the hub to the remote(s) and data packet frames from a remote to the hub.

A sequence number field 178 occurs next in the frame 152. The sequence number 178 is a counter value which is incremented every time a communicator 60 sends a frame 152. The sequence number 178 allows the receiving communicator 60 to specify which frame (or frames) 152 needs to be resent in the event a transmission error or other problem. In the preferred embodiment, the sequence number is incremented by 1, modulo-256, after every frame 152 transmitted by a communicator 60. Frame acknowledgements and retransmission requests are based on this sequence number, so no more than 255 unacknowledged frames 152 must be permitted to be outstanding at any time. Retransmissions of unacknowledged or negatively acknowledged frames reuse the same sequence numbers as the original frame being retransmitted. Remotes 66 maintain one sequence value which is used and incremented for each transmitted frame 152. Hubs 64 maintain sequence number values for the maximum number of communicators 60 allowed in the Group. One of these sequence values is used for information frames, outgoing broadcast data packet frames, and beacon frames, and the other sequence values are used for directed frames transmitted to each of the remotes 66 with allocated Txops.

An ending frame number field 180 follows the sequence number field 178. The ending frame number field 180 is used in frames 152 sent from remotes 66 to hubs 64 to acknowledge the successful reception of a contiguous block of sequenced frames from the hub 64. The value in the ending frame number field 180 is the highest (e.g., modulo-256 with wrap-around) sequence number value of all successfully received frames 152 up to the latest sequence number that has been successfully received. The ending frame number field 180 is not used in frames 152 sent from hubs 66 to remotes 64, because frames 152 sent by remotes 66 to the hub 64 during the inbound portion 74 of the communication cycle 70 (FIG. 3) are acknowledged in the information frame sent by the hub 64 to the remotes 66 during the information interval 76 of the outbound portion 72 (FIG. 3) of the next communication cycle 70. These acknowledgements in the information frame use the same format as this field (ending frame number).

A missing frame number field 182 follows the ending frame number field 180. The missing frame number field is used in frames sent from remotes 66 to hubs 64 to indicate exceptions to the reception status reported in the ending frame number field 180. The primary usage for the missing frame number field 182 is in cases where a Group of frames 152 in a transfer unit 144 has been successfully received, with the exception of one frame 152 somewhere prior to the end of the transfer unit. Under this circumstance, the ending frame number field 180 reports the sequence number of the last frame 152 within the transfer unit which was successfully received, and the missing frame number field 182 reports the sequence number of the single frame 152 prior to the reported last frame that was received in error. This permits significantly improved network efficiency in cases where only one frame 152 of a transfer unit is received in error, by permitting retransmission of only that one frame 152, and not requiring retransmission of all subsequent frames 152 that have been received successfully. In cases where no such erroneous reception occurs, or where multiple erroneous transmissions were received, both the ending frame number field 180 and the missing frame number field 182 contain the same value (the sequence number of the last successfully received sequence of frames with no preceding erroneous frames). The missing frame number field 182 is not used in frames 152 sent from hubs 64 to remotes 66, because frames sent from remotes 66 to the hub 64 during the inbound portion 74 (FIG. 3) of the communication cycle 70 are acknowledged in the information frame sent by the hub 64 to the remotes 66 during the information interval 76 of the outbound portion 72 of the communication cycle 70. These acknowledgements in the information frame use the same format as this field (missing frame number).

A bandwidth allocation request (BWAR) field 184 occurs next in the header 162. The BWAR field 184 is used in frames 152 sent from remotes 66 to the hub 64 to indicate the amount of time needed to transfer all packets queued for transmission at that remote 66. The request value is in units of basic time increments (BTIs). The value in the BWAR field 184 is zero if there are no queued packets awaiting transmission, and is 255 if 255 or more BTIs are needed to transmit the queued packets. The BWAR field 184 is not used in frames 152 sent from hubs 64 to remotes 66, because all bandwidth allocation decisions are made at the hub 64.

A bandwidth request flag (BWRF) field 186 follows the BWAR field 184. The BWRF field 186 contains additional status information pertaining to the requested bandwidth allocation for frames to be sent from remotes 66 to hubs 64. This field is not used in frames 152 sent from hubs 66 to remotes 64, because all bandwidth allocation decisions are made at the hub 64. Codes used in this field signify, for example, whether any frames have been waiting for transmission for more than two communication cycles 70 for reasons other than retries due to negative acknowledgement, whether any of the frames awaiting transmission are retries, whether the remote 66 is within a predetermined threshold of exhausting the amount of buffer memory available to hold frames queued for transmission, whether packets are queued from more than two different nodes 34 on the remote's directly-attached LAN segment 30, and whether any broadcast frames are queued for transmission. These flags provide information useful to the hub's bandwidth allocation process, especially in cases where the network is saturated and not all bandwidth allocation requests can be granted.

The next field is a body length field 188 which signifies the length of the body field 164 (FIG. 8) of the frame 152. The code in the body length field 188 is an unsigned integer that indicates the number of data bytes in the body 164 of the frame 152. This value includes all bytes from the first byte following the header 162 (FIG. 8) to the last byte before the ending flag 166 (FIG. 8), and does not include any bytes in the header 162, starting flag 160, ending flag 166 or CRC field 168. Bits added by the bit stuffing (if any) are not counted in this length because they are added during transmission after the frame is formatted and are stripped at reception before the frame's fields are processed. The minimum body length is zero (for basic control frames), and the maximum body length is defined by the maximum number of bytes in the longest allowable frame, which is 1536 bytes in the preferred embodiment.

Next, a calibration parameters field 190 is used to transfer calibration parameter information between communicators 60. The values in this field reflect the current readings for autonomous parameters, such as temperature, or the values during the last frame 152 received from the other communicator 60 for receive-specific parameters, such as RSSI. In general, values for the various parameters mentioned herein to secure proper operation of the RF modem 92 (FIG. 5) may be contained in the calibration parameter field 190.

The firmware at a communicator supporting the functionality of the RF modem monitors a plurality of calibration parameters supplied by the RF modem, and generates corresponding calibration responses to ensure proper transmitting and receiving operation whenever the RF modem is active. The aspects of the calibration activities that are visible at the protocol level include the need to communicate certain of the calibration parameters to the partner communicator in frame headers 162, the need for hubs to maintain separate calibration response values for each of the remotes that are currently active, and the need for a newly-active remote to conduct a signal acquisition procedure prior to requesting a Txop allocation from a hub.

The information that is available from the calibration process that may be used includes an RF AGC loop parameter which provides information regarding the level of received RF energy from another communicator on the same frequency channel, whether or not that communicator is using the same spreading code; and a received signal strength indicator (RSSI) parameter which describes the strength of the demodulated, despread received signal. The relative values of RF AGC and RSSI are useful in discriminating receptions from other communicators using the same frequency channel but a different spreading code, from communicators on the same frequency channel that employ the same spreading code and hence are members of the Group. In addition, other calibration parameters include a Costas loop parameter, a RF synthesizer loop parameter, a temperature for the oscillator circuitry of the RF modem, an in-phase signal (I magnitude) parameter, a quadrature phase signal (Q magnitude) parameter, and a delay locked loop (DLL) parameter. Calibration parameter responses include: a Costas loop preset value, a RF synthesizer loop preset value, a RF AGC loop preset value, a RF oscillator bias value, a delay locked loop bias value, a baseband AGC preset value, a baseband AGC reference value, and a RF AGC reference value.

Several additional digital signals are defined for use as part of the signal acquisition process between the hub and the remotes, and these acquisition signals are presented in conjunction with the calibration parameter responses. The signal acquisition responses include one used to select between the two available antennas of the RF modem, two used to enable information for controlling the usage of the preset calibration parameter values by the RF modem circuitry and two weighting controls used to distinguish signal acquisition (during the preamble) from normal reception.

As shown in FIG. 8, the body 164 of the frame 152 follows the header 162. The body contains information specific to the particular frame type identified in the type field 176 (FIG. 9) of the header 162. In the case of data packet frames, the body will be an encapsulated LAN packet from the LAN segment 30 that is being bridged by the communicators 60 or a LAN packet directly from the attached resource in cases where the communicators are being used as network adapters rather than as bridges. In the case of control, information, and beacon frames, the contents of the body 164 provide control information to communicators 60 receiving the frames.

An ending flag 166 follows the body 164 of the frame 152 and, similar to the starting flag 160, the ending flag 166 is a unique bit pattern that provides unambiguous identification of the end of a frame 152. In the preferred embodiment, the value of the ending flag 166 is represented by seven consecutive one bits preceded by a zero bit and, thus, is distinct from the preamble 146 (alternating ones and zeros), the postamble 150 (all zeros), the IFGs 154 (all zeros) and the starting flag 160 (six ones preceded and followed by zeros). Like the starting flag 160, the uniqueness of the value of the ending flag 166 is guaranteed without restricting the use of any data values within the header 162 or body 164 fields of the frame 152 by bit stuffing within the header 162 and body 164 fields of the frame 154. The ending flag 166 is generated by the transmitting communicator 60 during frame transmission, and is detected by the receiving communicator 60 during frame reception.

The last field of the frame 152 is a cyclic redundancy check (CRC) field 168. The CRC field 168 provides for the detection of communication errors in the physical transmission by providing a CRC word generated by the transmitting communicator and checked by the receiving communicator 60. The value in the CRC field 168 covers all bytes from the first byte after the starting flag 160 through and including the ending flag 166. Cyclic redundancy checking is known in the art, but in the preferred embodiment, the CRC value is calculated by the polynomial $x^{16}+x^{15}+x^2+1$, also known as CRC-16. The CRC logic in the communicators 60 is designed in a manner that the CRC remainder value is zero after reception of an error-free frame. The use of a CRC code, which allows error detection but not error correction, is based on the high data reliability provided by the preferred form of the RF modems described above. In cases where data reliability on the RF link is worse than about one in $10^6$, the use of an error-correcting code, such as a Reed-Solomon code, is recommended for the contents of the CRC field.

Four different types of frames are used to establish communications in accordance with the protocol of the present invention. The four types of frames are information frames, control frames, data packet frames and beacon frames. Information frames are used to broadcast communication cycle control information from the hub to the remotes. Control frames are used for bilateral transfer of protocol control information between communicators. Data packet frames contain substantive data, such as the LAN packets which are being bridged between LAN segments 30 or transferred between nodes 34 by the communicators 60. Beacon frames are transmitted by hubs 64 so that adjacent hubs can detect each other's presence. Each of these four types of frames is described in detail below.

There are two information frames. A primary information frame is transmitted during the information interval 76 of the communication cycle 70 shown in FIG. 3. An alternate information frame is transmitted during the alternative information interval 82 of the communication cycle. The primary and the alternate information frames are identical and are described below. However it should be noted that the portions of the information frames which specify usage during the broadcast interval 78 and the directed interval 80 will be meaningless if a remote first successfully receives the alternate information frame during the alternative information interval 82, because the broadcast and directed intervals will have passed before the information is available. Thus communicators which only receive the alternate information frame must ignore the information relating to the broadcast and directed intervals of the communication cycle.

In the case of an information frame, its frame type field 176 (FIG. 9) contains a value which distinguishes it from the other types of frames. The body field 164 (FIG. 8) of the information frame contains all of the information needed by remote communicators to participate in communication in accordance with the communication cycle 70 shown in FIG. 3. The body field of an information frame includes a number of different fields which provides information describing each of the following types of information: (1) the number of Txops 84 which are currently allocated; (2) a security level established for the communication with the Group, for example, to allow any communicator to join or leave the Group, to limit the size and participants of the Group to a predetermined number or to predetermined ones of communicators, or the like; (3) acknowledgement (ending frame number/missing frame number) information to each remote communicator which has been allocated a Txop; (4) the number of BTIs in the present communication cycle; (5) the number of BTIs in the next communication cycle; (6) the number of BTIs in the communication cycle after the next communication cycle; (7) the number of BTIs for the broadcast interval 78; (8) the number of BTIs from beginning of the present communication cycle to the transmission time of for any directed packets sent during the directed interval 80 to each remote which has been allocated a Txop, including a code for remotes which have allocated Txops but for which the hub has no outbound directed packets pending for transmission; (9) the number of BTIs from beginning of the present communication cycle until start of inbound portion 74 of the communication cycle; (10) the number of BTIs from beginning of alternative information interval 82 until start of the inbound portion 74 of the communication cycle; (11) the number of BTIs from beginning of inbound portion 74 of the communication cycle to the beginning of the allocated Txop for each remote which has been allocated a Txop, including an entry for all of the allowable Txops, regardless of whether the Txop has been allocated to a remote; (12) the number of BTIs of duration for each allocated Txop; (13) the number of BTIs from beginning of the inbound portion 74 (FIG. 3) of the communication cycle to the start of the Txop request interval 86 of the communication cycle; (14) the number of BTIs from the beginning of the inbound portion 74 to the start of hub beacon interval 88 of the communication cycle (FIG. 3), with an indication if the communication cycle will not include a hub beacon interval; (15) a code indicating characteristics of the hub, to be used for communicators to arbitrate between one another to establish a new hub or to confirm the selection of the existing hub, including information describing whether the existing hub is operating from AC power or batteries, whether the communicator is configured as hub or has assumed hub operation due to lack of a better candidate communicator, whether a resource attached to the local LAN segment of the communicator is a LAN server; (16) the number of active nodes on the local LAN segment attached to the communicator; (17) the name of the Group; and (18) a bit map of the LAN node IDs in use on all of the LAN segments bridged together by the present invention (only if bridging is being performed).

The various information in the body of the information frame provides the remote communicators with the basis for their RF communication activities for the remainder of the communication cycle. Of special significance are the various items that define the starting times and durations of the subsequent intervals of the present communication cycle and the lengths of the next two communication cycles. The information frame, in addition to conveying the information described above, also provides the information by which the remotes remain synchronized with the hub for the purposes of turning their RF transmitters and receivers on and off. The start of the information frame (or alternate information frame if the remote is unable to successfully receive the information frame) serves as the datum from which the starting times of all other intervals within the communication cycle are measured.

Each remote communicator uses an internal clock, maintained by its microcontroller 90, to measure times until significant events (such as the expected arrival of frames to be received from the hub and the start of the allocated Txop) relative to the time that the information frame was received. The importance of correct measurement of those times necessitates frequent resynchronization of the remotes to the sense of time promulgated by the hub. This is because the clock oscillators on each of the communicators will necessarily will operate at slightly different speeds, so the time measurement on these communicators will "drift" apart the longer it has been since they were last synchronized.

Commonly available, low cost quartz crystals provide oscillators that are accurate to $\pm 0.01\%$, which can result in up to 100 microseconds of clock drift per second. A reasonable goal for inter-communicator synchronization is not over 10% of the BTI duration. In the preferred embodiment, the BTI is 4 milliseconds, so that the permissible clock skew is 400 microseconds, allowing communication cycles up to about 2 seconds in total length.

This upper bound on the length of the communication cycle defines the worst case uncertainty as to when receivers must be enabled to be sure to be active in time to receive expected transmissions. By re-synchronizing all communicators in the Group sufficiently often, this uncertainty can be kept small enough to avoid reducing network throughput due to extremely long delays to combat timing uncertainty.

For each interval within the communication cycle of interest to a particular remote, the remote must measure the time, from receipt of the information (or alternate information) frame until the interval of interest, using the appropriate count of BTIs from the body of the information (or alternate information) frame. Each remote may make autonomous decisions about whether to disable or power down portions of its circuitry based on its own power consumption characteristics, power supply characteristics (AC vs. battery, amount of battery charge remaining, etc.), and the amount of time between events of interest. As a minimum, each active remote must attempt to receive each information frame, and must attempt to receive the alternate information frame whenever it is unable to successfully receive the information frame, for a given communication cycle.

Another key reason that the receipt of information frames is critical is that the lengths of communication cycles are constantly changing, as is discussed below. In order for a remote to remain in contact with its hub, the remote must know the duration of the current communication cycle. This duration, as well as the durations of the next two communication cycles, are reported in each information frame. This provides a reasonable margin for RF communication errors, since, at a minimum, a remote must successfully receive one information frame or alternate information frame out of every two communication cycles (1 out of 4 such frames) to remain synchronized with the hub. Because the remotes all have their RF modems active to receive each information frame, the hub also uses this frame to send all acknowledgements and bandwidth allocations.

A number of different types of control frames are employed. Those include a basic control frame, a Txop request control frame, a Txop grant control frame, a Txop relinquish control frame, a hub handoff request control frame, and a hub handoff acknowledgement control frame. Each is described below in greater detail.

The basic control frame is used by remotes for non-piggybacked acknowledgements (acknowledgements to outbound directed frames when there are no inbound frames on which to piggyback these acknowledgements), bandwidth requests when the allocated Txop is too short to accommodate any of the messages which it has queued for transmission, and to prevent the loss of the allocated Txop due to inactivity when no LAN traffic is occurring on its attached LAN segment. The basic control frame utilizes the header field 162 (FIG. 8) with a zero-length body field. The acknowledgement and bandwidth request fields in the header ordinarily contain non-null information.

Each remote in the Group requests a Txop allocation from the hub when that remote becomes active or enters the communication space of the hub. Each remote must obtain a Txop allocation prior to engaging in data communication over the RF network. A Txop will be allocated by the hub on the next communication cycle unless all available Txops are in use. A Txop 84 (FIG. 3) is a fixed position in the order of Txops within the inbound interval 74 (FIG. 3), but a Txop is not a fixed amount of transfer bandwidth on any particular communication cycle. The hub allocates Txops to remotes in the order Txop requests are received. Once allocated, a remote retains its Txop until relinquished explicitly by a control frame from the remote to the hub or until relinquished implicitly from non-usage by the remote for a predetermined number of communication cycles. The maximum number of Txops which can be allocated by a hub is the maximum number of concurrently operable remote communicators in the Group. In the preferred embodiment, using RF modems with a 382 Kbps data rate, a reasonable maximum size is 16. With higher-speed RF modems, the number can be greater.

The Txop request frame is used by newly active remotes to request a Txop allocation from the hub. Since the remote does not have a Txop in which to send this request, the Txop request frame is sent in the Txop request interval 86 (FIG. 3). This interval occurs immediately after the completion of the last of the inbound Txop communication cycle.

Sending the Txop request control frame in the described manner during the Txop request interval 86 (FIG. 3) may result in successful communication between the remote and the hub, or may result in a destructive collision if multiple remotes are sending Txop request frames simultaneously. If the hub fails to respond with a Txop grant control frame (either positive, allocating a Txop, or null, indicating the unavailability of any Txops) within a predetermined number of subsequent communication cycles, the remote will repeat the Txop request frame after expiration of a random number (e.g., one to eight) of communication cycles. By retrying at random intervals, the probability of repeated collisions among multiple, concurrent requesters is reduced to an acceptably low level. In the case of Groups operating with a dynamically selected hub, the response of the hub to the Txop request frame may be a hub handoff request frame in cases where the hub arbitration fields of the Txop request frame indicate to the active hub that the new communicator sending the Txop request frame is a better choice to be the network hub.

The Txop request control frame utilizes a number of fields in the body 164 (FIG. 8) to convey the information necessary for performance in accordance with the present protocol. The body of the Txop request frame includes fields containing codes which convey the following types of information describing the characteristics of the communicator sending the Txop request frame: (1) hub arbitration information describing whether the communicator is operating on AC power or battery power; (2) whether the communicator is configured to operate as a hub; (3) whether any resource on the communicator's directly attached LAN segment 30 is a network server; (4) the number of active nodes on the directly attached LAN segment 30; (5) the name of the Group (to permit detection of name conflicts between Groups); and the name of the communicator (assigned by the user) to facilitate network statistics gathering and administration.

The Txop grant control frame is generated by the hub in response to a Txop request frame received by the hub during a previous communication cycle. The Txop grant frame also utilizes the body of the frame to hold a field containing a code indicating the transmission Txop number which the hub has allocated to the remote communicator sending the Txop request frame. A Txop number of zero indicates denial of the Txop request.

The Txop relinquish control frame is sent by a remote to the hub to indicate that the remote sending the Txop relinquish control frame will cease using its allocated Txop. This information is communicated solely by the header of this frame, so the body length field is zero.

The hub handoff request control frame is sent by the existing hub to a remote which the hub has determined is more suitable for acting as the hub for the Group. The hub handoff request frame is a request that the remote communicator addressed by this frame accept responsibility as the hub and to thereafter control communications by managing the communication cycles. The hub which sends the hub handoff request frame will have determined that the remote to which the this request is addressed is better configured to serve as the hub, based on the hub arbitration information contained in the Txop request frame previously sent by the communicator as compared to its own hub arbitration information, contained in its information frame. The hub handoff request control frame includes a sufficient number of fields in its body to convey the request and other information needed by the remote to accomplish the handoff of hub operation. This information includes various traffic and calibration parameter values.

The handoff acknowledgement control frame is sent by the remote to the hub in response to the receipt of a hub handoff request frame. The handoff acknowledgement frame indicates the fact that the remote will become the hub or the rejection by the hub of the handoff request.

The data packet frame is employed to convey network data in the body field of the frame. The data for the body of the data packet frame is usually a LAN packet being bridged to or from the local LAN segment or a LAN packet from the attached resource in cases where the communicators are serving as LAN adapters rather than network bridges. Directed data packet frames sent from a remote to a hub are addressed to the destination communicator (CDID). Broadcast data packet frames are sent by a remote to the hub when the hub is to retransmit the data packet frame as a broadcast or a multicast to all communicators in the Group. The CDID of a directed packet frame sent by a remote is that of the hub if the ultimate destination is to a node on the local LAN segment directly connected to the hub.

The CDID of a directed data packet frame sent by a remote to the hub is that of another remote communicator if the ultimate destination is to a node on another remote LAN segment and the hub is only to serve as a frame repeater in conveying the data packet frame to its ultimate destination. The source address (CSID) of the data packet frame sent by a remote to the hub is always the ID of the remote. For data packet frames sent by the hub to a remote, these frames are addressed to the remote destination communicator, or if the data packet is to be broadcast or multicast, to an address indicating a broadcast or a multicast. The destination address (CDID) of the directed data packet frame to the remote is the address of the remote communicator for all non-broadcast data packet frames. The source address (CSID) is unmodified if the hub is repeating a data packet frame previously received from another remote. The CSID is the address of the hub communicator if the body portion of the data packet frame originated from the LAN segment directly attached to the hub.

Two different types of hub beacon control frames are employed in the protocol of the present invention. A hub beacon frame is transmitted to identify the fact that the existing hub is functioning as a hub for the Group. The body portion of the hub beacon frame contains sufficient information to present all of the relevant information concerning the characteristics and the functionality of the hub. The hub beacon frames are sent using a special inter-hub spreading code used solely for this purpose and never used for hub-to-remote transmissions. Upon receipt of the hub beacon frame by another hub operating on the same frequency channel within the RF range of the first hub, the other hub will transmit a beacon reply frame. The beacon reply frame constitutes a recognition of a possible conflict in operation between the two hubs. The beacon reply frame sent by the other hub also contains the relevant information concerning the characteristics and the functionality of the other hub and is also sent on the special inter-hub spreading code. Based on the information contained in both the hub beacon frame from the first hub and the beacon reply frame from the other hub, the hubs will attempt to adjust their operational characteristics to avoid RF transmission conflict. Because each newly-active hub seeks a clear frequency channel prior to listening for hub beacon frames, the detection of and reply to the hub beacon frame will only occur if the hubs must share a single channel. Upon establishing such communication, the two hubs attempt to negotiate a sharing of the available bandwidth on the single channel by adjusting the length of their respective communication cycles to place their information intervals 76 at different times and by assigning limited (roughly half) of the time in their inbound portions 74 to Txops such that the unassigned portions are free for allocation by the other hub for remotes in the Group.

Acknowledgements are generated for all directed data packet frames. Broadcast data packet frames, information frames, and beacon frames are not acknowledged. Control frames are implicitly acknowledged through control activity, such as bandwidth allocation, Txop assignment or frame re-transmission. The acknowledgments from hub to remote are sent in the information frames. The acknowledgements from remote to hub are piggybacked on subsequent data packet or control frames if possible, but are conveyed in basic control frames if no other pending frames are available.

Positive acknowledgements and negative acknowledgements must be generated during the communication cycle immediately following the communication cycle in which the frame which is being acknowledged was transmitted. Non-acknowledgement for two communication cycles is treated as equivalent to negative acknowledgment by the source communicator. Retransmission of negatively acknowledged frames is the highest priority for allocated bandwidth. Retransmissions must occur during the first available Txop (of sufficient length) following the negative acknowledgement.

The information, control, data packet and hub beacon frames are employed in the communication cycle 70 in a manner that is more readily understood from FIG. 10. The communication cycle 70 shown in FIG. 10 is the same as that previously shown in FIG. 3, but is presented in an elongated form in FIG. 10. As shown in FIG. 10, the communication cycle 70 is subdivided into the outbound portion 72 used for transmission by the hub to the remotes and the inbound portion 74 used for transmissions by the remotes to the hub. Since all transfer units pass through the hub 64, remotes 66 only need to have their RF modems 96 enabled for frame reception during the relevant segments of the outgoing portion 72 of the communication cycle 70, and then need to have their RF modems 96 enabled for frame transmission only during the allocated Txops of the inbound portion 74. As a result, power may be conserved, which is especially important when the communicators 60 are powered by batteries.

As is shown in FIG. 11, the frames transmitted by the hub 64 during the information interval 76, the broadcast interval 78 and the directed interval 80 are all sent as a single transfer unit 144. The preamble 146 and postamble 150 introduce and conclude the transfer unit 144. The information frame 200, sent during the information interval 76, the broadcast data packet frames 202 destined to all of the remotes, sent during the broadcast interval 78, and the directed data packet frames 204 addressed to specific remotes 66, sent during the directed interval 80, constitute the payload 148 (FIG. 6) of the first transfer unit 144 sent by the hub 64 during the outbound portion 72 of each communicator cycle 70. By including the frames of the information interval 76, broadcast interval 78 and directed interval 80 together in one transfer unit 144, power consumption is optimized at the remotes 66 and network overhead for preambles and postambles is minimized. Since each remote 66 is required to enable its RF modem 96 to receive the communication cycle information during the information interval 76, each remote 66 simply leaves its RF modem 96 enabled for the duration of the outbound broadcasts (if any) and directed packets to its address, based on the appropriate fields from the information frame 200.

The second transfer unit 144 sent during the outbound portion 72 is a one frame transfer unit containing the alternate information frame, that repeats the information from the information frame 200 sent earlier during this communication cycle. The alternate information frame is sent in a separate transfer unit to permit the RF modems 96 at each remote to be able to re-acquire and re-synchronize to the incoming RF signal, thereby minimizing the risk of errors in receipt of the alternate information frame 206. The information defining the communication cycle is repeated in the alternate information frame due to its importance in synchronizing all of the remotes 66 to the hub's clock for proper timing of the start of events occurring during the communication cycle 70, thereby assuring the integrity of communication during the communication cycle 70. Remotes 66 that successfully received the information frame 200 for the current communication cycle 70 do not have to receive the alternate information frame 206.

The information interval 76 includes the preamble of the first transfer unit 144 sent during the outbound portion 72 and the primary information frame 200 which contains the communication cycle information, as shown in FIG. 12. The information frame 200 contains all of the information needed by remote communicators 66 to participate in the communication defined by the MAC protocol of the present invention. Information in the information frame 200 includes the length of the outbound and inbound portions of the communication cycle 70 measured in BTIs, the duration and destinations of outgoing frames sent during this communication cycle, acknowledgements to incoming frames received during the previous communication cycle 70, allocation of Txops to the remotes 66 during the inbound portion 74 of this communication cycle 70, and calibration parameters of the hub communicator 64 that permit adjustment of the remote communicators 66 to receive hub transmissions with the best achievable reliability.

Based on the information conveyed in the information frame 200, all remotes 66 enable their RF modems 96 at the time of the expected arrival of each information frame 200. Also based on the contents of the information frame 200, each remote 66 is able to determine when to enable its RF modem 96 for receiving transmissions, during the broadcast interval 78 and appropriate portions of the directed interval 80, and when to enable its RF modem 96 for transmissions, during its allocated Txop of the inbound portion 74. Acknowledgements of successful receipt of frames sent from the remotes 66 to the hub 64 occurring during the preceding communication cycle 70 are also included in the information frame 200. These acknowledgements information the remotes 66 of the need to retransmit some of the frames that were sent during the preceding communication cycle 70, or indicate that the remotes 66 can reclaim the buffers holding those frames because the hub successfully received them.

Because many items in the information frame 200 must be interpreted by the remotes 66 in real time, a longer IFG 154 is used between the information frame 200 and the next frame in the hub's transfer unit.

Broadcast data packet frames received by the hub 64, either from its locally attached LAN segment 30 or from a frame sent by a remote during the preceding communication cycle, are sent in broadcast frames 202 by the hub 64 immediately after the IFG 154 following the information frame 200. This optimizes power utilization at the remotes 66, because each remote 66 must enable its RF modem 96 to receive the information frame 200, and can leave the RF modem 96 enabled for the immediate reception thereafter of the outbound broadcast frames, if any, as indicated by the information frame.

Packets received by the hub 64 that are not addressed to nodes 34 on its local LAN segment 30 are transmitted during the directed interval 80 to the designated remotes 66 in directed frames 204 during the outbound portion 72 of the communication cycle 70 immediately following the cycle during which they were received.

The outgoing packets in the directed frames 204 are ordered by Txop 84 allocations. All directed data packet frames being sent to a particular remote 66 during any communication cycle 70 are transmitted sequentially (and in the order received). The information frame 200 indicates the relative starting time and absolute duration of the directed frames 204 to each remote 66 in the Group.

Remotes 66 with no pending directed data packet frames to receive, as indicated in the information frame, may disable their RF modems 96 after the outgoing broadcast interval 78, leaving them disabled until the anticipated arrival time of the next information frame 76. A determination is made at each remote 66 having directed packets pending to be received whether to leave the RF modem 96 enabled for reception, or to disable the RF modem 96 after the broadcast interval 78 and then to re-enable the RF modem 96 at the assigned time to receive directed packets addressed to them. This determination may be based on the type of active power source, for example, batteries or commercial power, and the power consumption versus time characteristics of the communicator 60.

Because of the critical nature of some of the contents of the information frame 200, especially the communication cycle duration, frame acknowledgement, directed frame timing, and Txop timing, and Txop allocation data, there is a potentially significant impact upon communications efficiency if one or more remotes 66 in the Group do not successfully receive an information frame 200. To reduce the risk of such non-reception, with little added overhead, the alternate information frame 206 is broadcast during the alternate information interval 82. The alternate information frame contains the same information as the primary information frame 200, is transmitted by the hub 64 in a separate transfer unit after the transfer unit containing the information from the information, broadcast and directed intervals has been sent.

A predetermined minimum time separation of the information frame 200 and alternate information frame 206 is provided, even in the absence of any outgoing broadcast or directed packets. This time period is determined to enhance the probability that a remote communicator which did not successfully receive the first information frame 200 receives the alternate information frame 206. Sending the alternate information frame 206 in its own transfer unit 144 with a separate preamble 146 achieves some of this time separation and may be needed to achieve reliable signal acquisition in some RF environments. Although the alternate information frame 206 is an exact copy of the primary information frame 200, the information conveyed during the broadcast and directed intervals will not be available to any remotes that utilize the alternate information frame 206. The information transmitted during the broadcast and directed intervals will have been lost prior to the remotes 66 obtaining the necessary information from the information frame 200 to participate in the communication cycle 70. Nonetheless, the lost information relevant to that remote from the directed interval 80 can be retransmitted pursuant to negative acknowledgement or lack of acknowledgment from this remote, which involves considerably less risk of overall communication failure than if the remotes 66 do not operate as expected during their portions of the communication cycle 70.

At the conclusion of these intervals of the outbound portion 72 of the communication cycle 70, the remotes 66 are permitted to transmit transfer units to the hub 64 during the inbound portion 74. FIG. 12 illustrates the separate transfer units from the remotes 66 transmitted during their allocated Txops 84. When the time for the Txop 84 of a remote 66 arrives, that remote 66 may send as many frames as permitted by the time allocated for this Txop in this communication cycle. In the absence of any frames awaiting transmission, the remote 66 may leave its Txop unused, or may send a control frame. The purposes of such control frames include acknowledging previous frames received from the hub 64 (although such acknowledgements normally would be piggybacked on inbound frames directed to the hub 64 from the remote 66), requesting a change in bandwidth allocation from the hub 64, and preventing this remote's Txop allocation from being expunged due to inactivity. At the conclusion of the Txop intervals 84 during the inbound portion 74 of the communication, remotes which have just joined the Group may request a Txop allocation. The Txop request is made in a one frame transfer unit shown in FIG. 13. This transfer unit includes the preamble 246, a Txop request frame 151, and a postamble 150.

At predetermined time intervals, for example every five seconds, a additional interval known as a hub beacon interval 88 is added at the end of the communication cycle. This interval is used for communication among nearby Groups in an attempt to avoid destructive interference between adjacent hubs that must use the same frequency channel. At the beginning of the hub beacon interval, a hub beacon frame 149 is transmitted in the transfer unit shown at the beginning of the hub beacon interval shown in FIG. 14. This transfer unit is sent using a special inter-hub spreading code. The remainder of this interval is used to listen on the same inter-hub spreading code for hub beacon reply frames 145 from other, nearby hubs. Thus, the transfer units transmitted during the hub beacon interval may be both inbound and outbound. The hub beacon intervals are inserted periodically at the end of communication cycles to occur so that not more than predetermined number of seconds elapse between the transmission of successive hub beacon frames by each hub.

There are a number of different operational aspects of the MAC protocol of the present invention which pertain to the communication cycle. Many of these operational aspects involve variations in the amount of time for the communication cycle itself and the intervals within the communication cycle. Details regarding these operational aspects are discussed below.

The duration of each communication cycle is adjusted to vary from the duration of the preceding and following cycles. The duration is adjusted by the hub following the rules outlined below. Each hub adjusts the duration of communication cycles such that successive cycles are never of equal length, in order to avoid possible interferences with a hub's transmissions created by regularly occurring noise and to minimize periodic interference with other RF devices due to this hub's transmissions. The adjustment rules seek to create the greatest amount of useful communication bandwidth while permitting the remotes to operate with their RF modems energized for minimum transmission and reception on-time. It is necessary for battery operated remotes to recognize when to expect the beginning of the next communication cycle, in order to power-up their RF modems to receive the information frames at the beginning of each cycle. To facilitate this knowledge, the hub transmits the lengths of each of the next two communication cycles as part of the information frame at the beginning of each communication cycle. Including the lengths of the next two cycles in each information frame permits remotes to remain adequately synchronized with the hub in cases where up to three successive information and alternate information frames are not successfully received.

The adjustments to the communication cycle involve the use of a coarse adjustment rule set and a fine adjustment rule set, operating simultaneously. The coarse adjustments establish the base cycle time duration of the communication cycle, using parameters such as the number of Txops allocated, the aggregate amount of traffic during recent cycles, and the number of remotes involved in sending that traffic. The fine adjustments establish the random variations in the length of successive communication cycles. These variations are relative to the base cycle time duration set by the coarse adjustment. The fine adjustment creates the time diversity for communication. With the resulting length randomization, interference between nearby Groups that cannot detect each other using the hub beacon and hub beacon reply frames or from a noise source having cyclic, but non-continuous transmissions, is not catastrophic to communication within the Group.

The time duration of each communication cycle is determined by the addition of a base time component and a fine random component. Latency adjustment rules establish the base time component and the fine random component is established relative to the base component. Both adjustment rules are described below.

The coarse adjustment involves changing the base cycle duration based on information relating to the number of remotes with allocated Txops and the subset number of those remotes that are requesting, or have recently used, communication bandwidth. The goal of the latency adjustment rules is to reduce power consumption by remotes during periods of little communication, while accepting the associated increase in communication latency during such periods of low usage. Dynamic compensation reduces this latency when the demand for communication bandwidth increases. This start-up latency at an increase in traffic levels is analogous to the spin-up delay that occurs prior to handling hard disk accesses on a portable personal computer that has stopped its disk drive motor as a power conservation measure.

The coarse latency adjustment of the base cycle duration is determined using a piecewise function whose default values are listed in the Table below. The vertical axis of this Table is Nfree, which is the number of unallocated Txops, using the example of 16 possible communicators in the Group. Generally the value Nfree is 15 minus the number of allocated Txops, since the hub will be one of the communicators is the Group. However, there are certain cases, such as conferences and manged Groups using roster security, where there can be a known total of allocatable Txops that is less than 15. The horizontal axis of this table is Nactv, which is the peak number of remotes that have requested a Txop allocation longer than the default duration during the present communication cycle or which have sent or received one or more directed data packet frames within a predetermined number of previous communication cycles.

The values obtained from the Table are the number of coarse adjustment units in the base communication cycle. Each coarse adjustment unit is a predefined (parameterized, with a default value of 16) number of basic time increments (BTIs).

LATENCY ADJUSTMENT TABLE

| Nfree | Nactv 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 9 | 7 | 5 | 5 | 5 | 6 | 6 | 8 | 8 | 8 | 10 | 10 | 10 | 12 | 12 | 12 |
| 1 | 9 | 7 | 5 | 5 | 5 | 6 | 6 | 8 | 8 | 8 | 10 | 10 | 10 | 12 | 12 | — |
| 2 | 10 | 7 | 5 | 5 | 5 | 6 | 6 | 8 | 8 | 8 | 10 | 10 | 10 | 12 | — | — |
| 3 | 10 | 7 | 5 | 5 | 5 | 6 | 6 | 8 | 8 | 8 | 10 | 10 | 10 | — | — | — |
| 4 | 11 | 8 | 5 | 5 | 5 | 5 | 6 | 7 | 8 | 8 | 10 | 10 | — | — | — | — |
| 5 | 11 | 8 | 5 | 4 | 5 | 5 | 6 | 7 | 8 | 8 | 10 | — | — | — | — | — |
| 6 | 12 | 8 | 5 | 4 | 5 | 5 | 6 | 7 | 8 | 8 | — | — | — | — | — | — |
| 7 | 12 | 8 | 5 | 4 | 4 | 5 | 6 | 7 | 8 | — | — | — | — | — | — | — |
| 8 | 13 | 9 | 5 | 4 | 5 | 5 | 6 | 7 | — | — | — | — | — | — | — | — |
| 9 | 13 | 9 | 5 | 5 | 5 | 6 | 6 | — | — | — | — | — | — | — | — | — |
| 10 | 14 | 9 | 5 | 5 | 5 | 6 | — | — | — | — | — | — | — | — | — | — |
| 11 | 14 | 9 | 5 | 5 | 5 | — | — | — | — | — | — | — | — | — | — | — |
| 12 | 15 | 10 | 5 | 5 | — | — | — | — | — | — | — | — | — | — | — | — |
| 13 | 15 | 10 | 5 | — | — | — | — | — | — | — | — | — | — | — | — | — |
| 14 | 15 | 10 | — | — | — | — | — | — | — | — | — | — | — | — | — | — |
| 15 | 15 | — | — | — | — | — | — | — | — | — | — | — | — | — | — | — |

The fine adjustment involves lengthening the current communication cycle by a randomly selected number of basic time increments, subject to limitations that keep this variation to be less than one coarse adjustment unit. For each communication cycle, the randomization value is a random number between 0 and one less than the number of BTIs in a coarse adjustment unit.

An allocation decision made within any communication cycle is the division between the outbound portion 72 and the inbound portion 74. The overall restrictions on the division between the outbound and inbound portions include the recognition that the communication cycle must never exceed a predetermined maximum amount of time and must never be less than a predetermined minimum amount of time. The maximum predetermined amount of time is established in accordance with the objectives of how frequently it is desired that a communication cycle occur, and in recognition that timing requirements particular to the higher layer LAN functionality of the LAN protocols in use on the attached network segments 30 must be met with respect to the bridging of LAN segments. The minimum length of time that must be provided for the inbound portion of any communication cycle is one BTI per Txop for transmission of a basic control frame to send acknowledgements and bandwidth requests. When a hub beacon interval is provided, the time available for this interval is obtained by reducing the time allocated for inbound Txops, even though the hub beacon frames are sent by hubs.

If the maximum time duration of a communication cycle is sufficient for transmitting all of the queued frames at the hub, plus all requested Txops for the remotes, plus a defined number (typically 1–4) BTIs per allocated Txop for remotes that are not requesting Txops, plus the hub beacon interval if needed, the outbound portion is allocated to be the length needed to transmit all of the queued frames at the hub. This condition is referred to as a non-saturated condition. By allocating the extra time to inbound portion with preference to the remotes with the largest magnitude of pending transmission requests, a rapid increase in inbound message traffic to the hub might generate a backlog of frames awaiting transmission at the hub. The increase in message traffic at the hub may well cause a subsequent increase in the outbound portion of the communication cycle to compensate for this increase.

If the maximum time duration of a communication cycle is insufficient to send all pending frames, the situation is described as a saturated condition. In the case of a saturated condition, a determination must be made as to which frames will be transmitted first. The priorities for making such decisions are described below, generally in descending order of importance. In other words, attempts will be made to satisfy the first itemized considerations prior to satisfying the last itemized considerations.

First of all, it is mandatory that sufficient time be allocated for the transmission of the complete information 200 and alternate information 206 frames during their intervals in the outbound portion 72 of the communication cycle 70, and for the hub beacon interval 88 (if needed during that communication cycle), and for at least one BTI per allocated Txop during the inbound interval. Secondly, sufficient time must be provided for transmitting all directed data packet frames already queued at hub during the directed interval 80 of the communication cycle 70. Third, sufficient time should be provided during the remote Txops for at least four BTIs per remote requesting a Txop, plus if possible, time to handle the full requested Txop length for one or more of the remotes requesting more than this amount of time (e.g. greater than 4 BTIs). These longer inbound allocations are granted to the remotes in order of descending request length. Fourth, sufficient time should be provided to transmit all queued broadcast data packet frames during the broadcast interval 98. Lastly, time will be provided for any other transmissions, including outbound directed data packet frames queued at hub after the saturation occurred.

Another adjustment which occurs within the inbound interval is the bandwidth allocation to each remote during its Txop 84. This bandwidth allocation controls the time duration length of the Txop. Even if a remote has requested and been allocated a Txop, the hub may adjust the length of the Txop during each communication cycle based on a number of different factors, including the aggregate traffic levels during recent communication cycles, the amount of data awaiting transmission at each remote with an allocated Txop, the elapsed time since the last Txop of the remote. Both the number and length of Txops are under control of the hub, and may be allocated in a manner that provides most of the available bandwidth to the communicators with the most traffic at each point in time. The allocation should provide an approximately fair sharing of bandwidth during periods of network saturation, while not limiting the burst nature of typical, nonsaturated LAN traffic patterns.

During any communication cycle, some remotes with allocated Txops may not be allocated any extra time for its Txop although every remote has, at least, the minimum-length Txop described above for the purpose of sending a control frame to acknowledge frames received from the hub and/or to request the allocation of a longer Txop to transmit queued, outgoing data packet frames.

When a remote's Txop arrives, that remote may send a single transfer unit that contains as many frames as the allocated Txop permits. In the absence of any frames awaiting transmission, the remote may leave its allocation unused, or may send a control frame. The purposes of such control frames include acknowledging previous hub transmissions in cases where there is no frame traffic in the direction of the remote to the hub on which to piggyback the acknowledgement, requesting a change in bandwidth allocation by the hub, and preventing the allocation from being expunged due to non-use.

The protocol of the present invention is preferably implemented as a state machine through the use of the microcontroller 90 and instructions contained in the memory of each of the communicators, the ROM 92 and the RAM 94 (FIG. 4). A state diagram representing the overall operation of a communicator is shown in FIG. 15.

Upon being first powered on, the communicator will reside in an initialization state (Listen RF) 250 with its RF modem activated for reception to "listen" for RF activity on predesignated possible frequencies and codes. Operational states of the communicator occurring prior to the Listen RF state are primarily activation and inactive states which have relevance to the communication occurring on the local LAN segments, and these states have been described in the aforementioned application which is incorporated herein by reference.

Generally in the Listen RF state 250, the communicator operates with the RF modem in a receiving mode, active to receive incoming transfer units. The communicator attempts to acquire a signal from a transmitting communicator and to detect a valid starting flag and frame header. If any such frame header is received, the communicator is aware that a hub is present, otherwise no communication would be taking place. Upon successfully receiving any frame and upon examination of the contents of the header of the frame, the communicator detects from the frame type field whether the message is inbound or outbound to determine whether the source or the destination of the frame is acting as the hub.

If no hub is detected in the Listen RF state 250, the communicator automatically will become the hub as the result of determining no other hub 64 exists, and will enter the Hub Active state 252. In the Hub Active state 252, the self-designated hub awaits transmissions from other communicators. If no transmissions are received for a predetermined period of time which is much longer than a communication cycle, the communicator acting as a hub enters an Idle state 254, in which the communicator powers down its RF modem. The communicator will remain in the Idle state 254 for a predetermined period of time, after which it will resume the Listen RF state 250 to determine the presence of network communications. If the communicator is connected to a LAN segment, it may return to the Listen RF state 250 upon receipt of a LAN packet from the local LAN segment, if it is determined that the LAN packet is directed to a node on a remote LAN segment. Details of how the communicator may discern this is described in the above referenced invention which is incorporated herein.

On the other hand, if an active hub is detected while in the Listen RF state 250, the communicator enters a Request Txop state 258, in which a Txop request frame is sent to the active hub during the next Txop request interval 86. The Txop request frame may elicit a number of responses from the hub. If the response is a Txop grant frame that allocates a Txop, the communicator enters the Remote Active state 260 and uses the allocated Txop. If the response is a Txop grant frame that denies the Txop allocation, the communicator returns to the Listen RF state 250. If the response is a hub handoff request frame, indicating that the present hub has determined from the arbitration values contained in the Txop request frame, that the requesting communicator would make a better hub than the present communicator acting as the hub, the communicator responds by sending a hub handoff reply frame and then enters the Hub Active state 252. Upon receipt of the hub handoff reply frame, the communicator acting as the hub ceases doing so and becomes a remote, using the last allocated Txop in the communication cycle.

The functionality of the communicators in each of the states 250, 252, 258 and 260 is discussed more specifically below in conjunction with FIGS. 16 to 19.

In the Listen RF state 260, the communicator performs the functions shown in the FIG. 16, which are referenced there with separate reference numbers. The communicator scans all useable frequency channels listening for the presence of a hub by "listening" to each of the predetermined, useable frequencies, starting by selecting the next available frequency channel as shown at 251. Having selected the available channel at 251, the communicator activates its receiver for a duration equal to 110% of the predetermined maximum permitted time duration of a communication cycle as shown at 253. By activating the receiver on each channel for 110% of the maximum time duration of a communication cycle, the communicator is certain to receive 100% of any communication cycle occurring, including the important information frames transmitted during the information interval 76 and the alternate information interval 82.

If no RF activity is detected, as determined at 255, the communicator then determines at 257 whether it has checked all available frequency channels. If the determination at 257 is that it has checked all available frequency channels, the communicator has made the determination that there are no other communicators active. Therefore, as the only active communicator, it becomes the hub, and enters the Hub Active state 252 (FIG. 15). On the other hand, if the determination is made at 257 that there are as yet other unchecked frequency channels, the communicator selects the next available frequency channel at 251, continuing in the Listen RF state.

Alternatively, if RF activity detected at 255, the communicator further determines at 259 whether the detected RF activity represents a valid frame, or whether the detected RF activity represents an irrelevant RF communication or interference. If the detected RF activity is a valid frame, the communicator enters a wait state at 261, remaining with its receiver active on that same frequency channel until it receives an information frame transmitted during the information interval 76 or the alternate information interval 82. Once an information frame is successfully received, the communicator will be able to determine the time of the next Request Txop interval 86 to request a Txop, and the communicator enters the Request Txop state 258.

However, if the detected RF activity is determined at 259 not to be a valid frame, but before concluding that the RF activity is irrelevant, the communicator adjusts the calibration parameters of the receiver as shown at 263. As discussed above, the communicator may adjust various calibration parameters to attempt to improve reception. The changed or improved reception allows another opportunity to determine whether the RF activity is a valid frame. Following the calibration adjustments at 263, the determination is made at 265 if the RF activity presents a valid frame. If so, the communicator returns to the wait state at 261 to await reception of an information frame, at which time the communicator will transition to the Request Txop state 258. If the determination made at 265 is that, even after adjusting the calibration parameters, the RF activity detected does not present a valid frame, the communicator makes a determination at 257 whether there are additional available channels to be checked. If there are additional channels to be checked, the communicator selects the next channel at 251. If all available channels have been checked, as determined at 257, the communicator transitions to the Hub Active state 252.

In the Request Txop state 258, the communicator performs the functions shown in the FIG. 17, which are referenced there with separate reference numbers. The communicator enters the Request Txop state 258 after detecting the presence of a hub. From the information frame received during the Listen RF state 250, the communicator determines the anticipated arrival time of the next Request Txop interval at 267, at which time the communicator transmits a Txop request frame to the hub at 269. The communicator then awaits a reply to its Txop Request frame from the hub, leaving its receiver active to receive the next communication cycle as shown at 271. The communicator then makes a determination at 273 whether and what type of reply it has received from the hub in the next communication cycle.

If the determination is made at 273 that the communicator has received no reply from the hub, the communicator waits a random number of communication cycles as shown at 275, and then determines at 267 the anticipated arrival time of the next Txop request interval 86. The communicator waits a random number of cycles because its Txop request may have been interfered with by another Txop request from another communicator. Because it is possible that the hub did not properly receive the interfering Txop request frames and thus replied to none of them, waiting for a random number of communication cycles to send another Txop request reduces the chances of continued possible interference from another Txop request frame.

If the determination is made at 273 a Txop grant frame was received in response to the Txop request frame, a further determination is made at 277 as to whether the Txop number in the body of the Txop grant frame is zero or non-zero. A zero Txop in to the Txop grant frame indicates that the hub has denied a Txop to the communicator. A Txop denial will cause the communicator to transition to the Lister RF state 250. On the other hand, if the Txop has been allocated, the communicator transitions to the Remote Active state 260.

Alternatively, if the determination is made at 273 that a hub handoff frame has been received, the hub has decided that the requesting communicator is a better choice for the Group hub than the current hub. This occurs from an implicit hub arbitration process conducted at the active hub when each Txop request frame is received.

The arbitration criteria are stored in the ROM 92 or RAM 94 of each communicator and constitute a part of the MAC protocol of the present invention. The hub arbitration criteria are described in descending order of importance. First, the hub will consider whether either one of it and the new requester are powered by continuous AC power or whether each is battery powered. Because the hub's RF modem is continuously active for transmitting and receiving, it is highly desirable to have a communicator powered by continuous power. Second, if the first criterion is not dispositive because either both or neither of the communicators are continuously powered, the hub will consider whether one of these communicators has been preselected to act as a hub. Preselection may occur if, for example, it is known that a particular communicator is more centrally located or tends to encounter less interference than other communicators 60, or if one communicator tends to remain stationary while other communicators are more frequently moved, etc. If one of the communicators has been preselected as a hub, that communicator will be selected as the hub. If this criterion is not dispositive because neither or both of the communicators has been predesignated as a hub, the third criterion will be employed. The third criterion involves whether there is a node on the local LAN segment attached to each communicator which is designated as a LAN server. Assuming that a communicator attached to a server will be involved in more LAN traffic and that the data transfer will be more efficient if it is accepted from a directly connected server, the communicator directly connected to the LAN server will be given priority as a hub. The fourth criterion gives priority to the communicator which is directly attached to the LAN segment having the greater number of active nodes. It is again assumed that the communicator attached to the LAN segment having the most active nodes will be involved in more LAN traffic than others, hence it will be designated as the hub. Finally, if all the functionally-based criteria fail to singularly designate the hub, that communicator having the lower OUI will become the hub.

It should be noted that more than two communicators could be involved in a hub arbitration, and the same criteria would be established to determine which of the plurality of communicators will be designated as the hub. The active hub either confirms its own selection and sends Txop grant frames to all those communicators sending Txop request frames, or designates the superior hub candidate by responding to the Txop request frame with a hub handoff request frame. Upon receipt of the hub handoff request frame the communicator in Request Txop state 258 utilizes the data in the body field of the hub handoff request frame, responds to the (outgoing) hub with a hub handoff reply frame at 279, and enters the Hub Active state 252. In this case the previous hub becomes the user of the last Txop (typically 15) of the communication cycle, as it enters the Remote Active state 260.

In the Hub Active state 252, the communicator performs the functions shown in the FIG. 18, which are referenced there with separate reference numbers. The hub first allocates Txops based on Txop request frames received from the previous communication cycle as shown at 262. Then, based upon the length and number of pending broadcast and directed frames and requested Txops, the communicator determines at 264 a coarse duration of the communication cycle, and the communicator then adjusts this duration at 266 with a randomly-selected fine duration adjustment.

Once the duration of the communication cycle has been established at 264 and 266, the communicator assembles the information frame and transmits it to all of the remotes as shown at 268. The hub determines at 270 if broadcast frames are pending and, if so, transmits the pending broadcast frames to all remotes as shown at 272. After pending broadcast frames are sent or if the determination is made at 270 that there are no broadcast frames pending, the communicator determines at 274 if there are any pending directed frames. If there are, the directed frames are transmitted to the remotes as shown at 276. After the directed frames are sent at 276 or if the determination is made at 274 that there are no directed frames to be sent, the communicator retransmits at 278 the information frame as the alternate information frame to all remotes. Next, if the determination made at 280 indicates that Txops have been allocated, the communicator receives the pending incoming frames from the remotes as shown at 282. After receiving all the pending incoming frames, or if it is determined at 280 that there are no Txop allocations, the hub communicator then allows a predetermined interval of time to pass for remotes to transmit Txop request frames to the hub as shown at 284, in the event that there may be newly active remotes which have not yet requested a Txop. After awaiting transmission of Txop request frames during the Txop request interval, the hub determines at 286 whether there is a need for a hub beacon interval in this communication cycle at 286. If not, the hub returns to 262 to begin the next communication cycle. Otherwise, the hub sends a hub beacon frame at 288, waits for possible hub beacon reply frames at 290, and returns to 262 to begin the next communication cycle.

In the Remote Active state 260, the communicator performs the functions shown in the FIG. 19 which are referenced there with separate reference numbers. The communicator activates its RF modem to receive the information frame from the hub as shown at 290. The remote, based upon the information contained in the information frame, then makes a determination at 292 whether broadcast frames are pending and, if broadcast frames are pending, the remote receives the broadcast frames and queues them for transfer to the local LAN segment as shown at 294. After the broadcast frames have been received at 294 or if the determination at 292 indicates that there are no broadcast frames pending, the communicator, based on the information contained in the information frame, makes the determination at 296 whether any directed frames are pending for transmission to it. If directed frames are pending, the communicator determines to activate its RF modem to receive the directed frames. The directed packet frames are received and the LAN packet portions thereof are queued for transfer to the local LAN segment as shown at 298. If the determination is made at 296 that no directed frames are pending, the communicator can power off its RF modem, as shown at 300, until it needs to be activated again.

After the directed frames are received from the hub as shown at 298 or the determination is made at 296 that there are no directed frames intended for the remote, the remote makes a determination at 302 whether its Txop is pending immediately. If the Txop is not immediately pending, the remote remains with its RF modem powered down until its Txop time arrives as shown at 304. Once the Txop time arrives, the remote will determine whether it has any pending frames to send to the hub as shown at 306. If inbound frames are pending, the remote activates its RF modem and transmits the pending frames to the hub as shown at 308. On the other hand, if is determined at 306 that there are no pending frames, the remote sends a control frame to preserve its allocated Txop for use in later communication cycles as shown at 310. Whether the remote transmits pending inbound data packet frames or a control frame to reserve its place, the remote will notify the hub in the BWAR field 184 and BWF field 186 of the header 162 of the number and size of pending frames it requests to send during the next communication cycle. The absence of such a frame, or a frame with a value of zero in the BWAR field yields a minimum length Txop for the next communication cycle.

Once the pending inbound frames are sent or the control frame is sent, the remote powers down its RF modem as shown at 312 and then returns to 290 to await the information frame at the start of the next communication cycle.

The previous description demonstrates the significant aspects of the MAC protocol of the present invention in providing efficient communication between communicators without the need for a wired communication medium and to accommodate communicators on a basis which permits them to join the Group on a non-specified basis, among other things. In addition, the protocol of the present invention offers significant advantages and improvements for use with battery powered communicators in allowing substantial power conservation, thereby extending the use time period for such communicators to a time period comparable to the use time period of the of a battery powered portable computer, thereby facilitating the use of such battery powered portable computers for information and resource sharing purposes though the single logical network available from the protocol of the present invention. Many other advantages and improvements will be apparent after comprehending the significant aspects of the present invention.

A presently preferred implementation of the MAC protocol of the present invention and many of its improvements have been described with a degree of particularity. This description has been made by way of preferred example, but the scope of the invention should not necessarily be limited by this exemplary description. What should be understood, however, is that the scope of the present invention is defined by following claims.

The invention claimed is:

1. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each communication cycle having intervals during which the hub and the remotes transmit and receive frames;

the hub transmitting cycle establishing information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the hub transmitting a frame containing the cycle establishing information which establishes both an outbound portion of the communication cycle when the hub transmits frames to the remotes and an inbound portion of the communication cycle when the remotes transmit frames to the hub, the frame containing the cycle establishing information also establishing the predetermined intervals during the outbound and inbound portions of the communication cycle when each remote is allowed to transmit and receive;

the remotes powering off their transmitters during times other than those intervals when the remote is allowed to transmit frames to the hub, by using the cycle establishing information transmitted from the hub; and the remotes powering off their receivers during times other than those intervals when the remote is expected to receive a frame from the hub, by using the cycle establishing information transmitted from the hub.

2. A communicator as defined in claim 1 wherein the predetermined functions further comprise:

the hub assigning transmission opportunities to the remotes, each transmission opportunity being an interval for a remote to transmit frames to the hub; and the hub transmitting transmission opportunity allocation information in the frame containing the cycle establishing information transmitted by the hub.

3. A communicator as defined in claim 2 wherein the predetermined functions further comprise:

the hub transmitting the frame containing the cycle establishing information to the remotes to establish a transmission opportunity request interval during the communication cycle when the remotes may transmit transmission opportunity request frames to the hub to request transmission opportunity allocations; and the remotes transmitting transmission opportunity request frames to the hub during the transmission opportunity request intervals.

4. A communicator as defined in claim 3 wherein the predetermined functions further comprise:

the hub allocating a transmission opportunity to the remote within a predetermined number of subsequent communication cycles after the transmission opportunity request frame is received by the hub; and the hub transmitting transmission opportunity allocation information during the communication cycle after the hub has received the transmission opportunity request.

5. A communicator as defined in claim 2 wherein the predetermined functions further comprise:

the hub allocating a predetermined amount of time for each transmission opportunity, the predetermined amount of time of the transmission opportunity being for a remote to transmit frames to the hub; and the hub transmitting the frame containing the cycle establishing information which contains the transmission opportunity allocation information during the communication cycle.

6. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub assigning transmission opportunities to the remotes, each transmission opportunity being an interval for a remote to transmit frames to the hub;

the hub transmitting transmission opportunity allocation information in a frame transmitted by the hub; and the hub allocating a number of transmission opportunities during at least one communication cycle which is at least one less in number than the number of remotes in the Group.

7. A communicator as defined in claim 6 wherein the predetermined functions further comprise:

the hub changing the transmission opportunity allocations in a subsequent communication cycle compared to a previous communication cycle by allocating a transmission opportunity to a remote which had previously not been allocated a transmission opportunity.

8. A communicator as defined in claim 7 wherein the predetermined functions further comprise:

the hub further revoking a previous transmission opportunity allocation of a remote to provide the transmission opportunity allocation to the remote which had previously not been allocated a transmission opportunity.

9. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub by using the information transmitted from the hub;

the remotes powering off their receivers during times other than those intervals when the remote is expected to receive a frame from the hub, by using the information transmitted from the hub;

the hub assigning transmission opportunities to the remotes, each transmission opportunity being an interval for a remote to transmit frames to the hub;

the hub transmitting transmission opportunity allocation information in a frame transmitted by the hub;

the hub transmitting information to the remotes to establish a transmission opportunity request interval during the communication cycle when the remotes may transmit transmission opportunity request frames to the hub to request transmission opportunity allocations;

the remotes transmitting transmission opportunity request frames to the hub during the transmission opportunity request intervals; and the hub transmitting information in a frame which requires a remote having a previously allocated transmission opportunity to relinquish the transmission opportunity.

10. A communicator as defined in claim 9 wherein the predetermined functions further comprise:

the remote relinquishing its previously allocated transmission opportunity by transmitting a frame containing the acknowledgement during its allocated transmission opportunity request interval.

11. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub assigning transmission opportunities to the remotes, each transmission opportunity being an interval for a remote to transmit frames to the hub;

the hub transmitting transmission opportunity allocation information in a frame transmitted by the hub;

the hub monitoring the frames transmitted by each remote during its transmission opportunity; and the hub revoking a previous transmission opportunity allocation of a remote which has not transmitted more than a predetermined number of frames during a previous number of communication cycles.

12. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub assigning transmission opportunities to the remotes, each transmission opportunity being an interval for a remote to transmit frames to the hub;

the hub transmitting transmission opportunity allocation information in a frame transmitted by the hub;

the hub allocating a predetermined amount of time for a transmission opportunity in each transmission opportunity, the predetermined amount of time of the transmission opportunity being for a remote to transmit frames to the hub;

the hub transmitting a frame containing the transmission opportunity allocation information during the communication cycle;

the hub adjusting the length of at least one transmission opportunity of at least one remote during at least one of a plurality of subsequent communication cycles; and the hub transmitting a frame containing the information establishing the adjusted length of the transmission opportunity prior to the time of the adjusted transmission opportunity in a communication cycle.

13. A communicator as defined in claim 12 wherein the predetermined functions further comprise:

the hub monitoring the frames transmitted by each remote during its transmission opportunity; and the hub further adjusting the length of the transmission opportunity relative to the number of frames transmitted by each remote during its transmission opportunity.

14. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub establishing the length of each communication cycle; and the hub transmitting a frame containing information describing the length of the communication cycle prior to the end of the communication cycle whose length is established.

15. A communicator as defined in claim 14 wherein the predetermined functions further comprise:

the hub adjusting the length of a communication cycle relative to the length of a previous communication cycle.

16. A communicator as defined in claim 15 wherein the predetermined functions further comprise:

the hub continually adjusts the length of the communication cycles.

17. A communicator as defined in claim 15 wherein the predetermined functions further comprise:

the hub allocating transmission opportunities to the remotes, each transmission opportunity being an interval for a remote to transmit frames to the hub; and the hub adjusting the length of a communication cycle relative to the number of transmission opportunities allocated.

18. A communicator as defined in claim 17 wherein the predetermined functions further comprise:

the hub allocating a predetermined amount of time for a transmission opportunity for a remote to transmit frames to the hub;

the hub monitoring the frames transmitted by each remote during its transmission opportunity; and the hub further adjusting the length of a communication cycle relative to the number of frames transmitted by each remote during its transmission opportunity.

19. A communicator as defined in claim 17 wherein the predetermined functions further comprise:

the hub further adjusting the length of the communication cycle by a randomly generated factor.

20. A communicator as defined in claim 19 wherein the maximum length of communication cycle with the randomly generated factor is less than two times the maximum length of the communication cycle without the randomly generated factor.

21. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators Of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub transmitting two frames containing information to establish the plurality of predeterminable intervals during each communication cycle, the second frame containing the information to established the plurality of predeterminable intervals occurring before the intervals in which the remotes are allowed to transmit frames to the hub.

22. A communicator for wirelessly transmitting frames to and receiving frames from a least one additional communicator in accordance with a predetermined medium access control protocol, wherein the communicators are adapted to be connected to a resource to obtain data from and to supply data to the resource, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

a first remote transmitting a first frame containing data to the hub during an interval established in a first communication cycle, the first frame containing data obtained by the one remote from the resource connected to the one remote; and the hub transmitting a second frame to a second remote during an interval established in a second subsequent communication cycle, the second frame containing the data contained in the first frame.

23. A communicator as defined in claim 22 wherein the physical distance between the first and second remotes is greater than the distance which either the first or second remote may reliably transmit frames.

24. A communicator as defined in claim 22 wherein the frames are transmitted by radio frequency signals and are received from radio frequency signals.

25. A communicator as defined in claim 24 wherein each remote further includes a plurality of antennas for receiving the radio signal, and the predetermined functions further comprise:

each remote selecting one among the plurality of antennas with which to receive the radio frequency signals during each communication cycle.

26. A communicator as defined in claim 25 wherein the predetermined functions further comprise:

each remote evaluating the strength of the received radio frequency signals with one antenna before selecting another antenna.

27. A communicator as defined in claim 26 wherein the predetermined functions further comprise:

the hub transmitting information to the remotes in a transmission unit which contains at least one frame, the transmission unit including a preamble; and each remote evaluating the strength of the received radio frequency signals in the preamble before selecting another antenna prior to the end of the preamble.

28. A communicator as defined in claim 27 wherein the predetermined functions further comprise:

each remote further receiving a portion of the preamble with the other antenna after selecting the other antenna.

29. A communicator as defined in claim 24 wherein the Group is established by those communicators which transmit and receive the radio frequency signals on the same radio frequency channels.

30. A communicator as defined in claim 29 wherein the communicators transmit and receive the radio frequency signals using direct sequence spread spectrum modulation established by a predetermined spreading code, and the Group is established by those communicators which modulate and demodulate the radio frequency signals using the same predetermined spreading code.

31. A communicator as defined in claim 24 wherein the predetermined functions further comprise:

the hub transmitting the information to the remotes in a transmission unit which contains at least one frame, the transmission unit including a preamble; and each remote synchronizing its receipt of signals transmitted from the hub during the communication cycle from the signal transmitted during the preamble.

32. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub transmitting information to the remotes to establish a first interval in the communication cycle during which a frame containing the information establishing the communication cycle and the plurality of predeterminable intervals is transmitted and a second interval during which the hub is allowed to transmit other frames to the remotes; and each remote determines whether to power off its receiver during the second interval based on the information transmitted during the first interval.

33. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub transmitting a frame containing information to establish a first interval in the communication cycle during which the information establishing the communication cycle and the plurality of predeterminable intervals is transmitted, and a second interval during which the hub is allowed to transmit broadcast frames to the remotes, and a third interval in the communication cycle during which the hub is allowed to transmit directed frames to the remotes;

each remote powers its transmitter during the second interval; and each remote determines whether to power off its receiver during the third interval based on the information conveyed during the first interval.

34. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined function comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub transmitting information to the remotes during a first communication cycle to establish the length of the first communication cycle and to establish the time for the beginning of the next subsequent second communication cycle; and the remotes powering on their receivers at approximately the anticipated beginning of the second communication cycle after having powered their receivers off during the first communication cycle, by using the information transmitted from the hub during the first communication cycle.

35. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub transmitting information to the remotes to establish a predeterminable hub beacon interval during one of a predetermined plurality of sequential communication cycles; and the hub transmitting a hub beacon frame during the hub beacon interval, the hub beacon frame containing information indicating that the hub is functioning as a hub for the Group and describing predetermined operational characteristics of the hub, the hub beacon frame being transmitted to another second hub of another second Group.

36. A communicator as defined in claim 35 wherein the predetermined functions further comprise:

the second hub receiving the hub beacon frame sent by the first aforesaid hub and in response thereto transmitting a hub beacon reply frame to the first hub during the hub beacon interval of the communication cycle of the first hub, the hub beacon reply frame containing information describing predetermined operational characteristics of the second hub; and the first hub and the second hub responding to the information in the hub beacon reply frame and the hub beacon frame to adjust their respective transmissions of frames and to adjust the communication cycles established to avoid conflict in transmissions.

37. A communicator as defined in claim 36 wherein the predetermined functions further comprise:

the first and second hubs each adjusting their communication cycles so they do not overlap one another.

38. A communicator as defined in claim 37 wherein the frames are transmitted by radio frequency signals and are received from radio frequency signals, and the predetermined functions further comprise:

the first and second hubs transmitting the hub beacon and the hub beacon reply frames on the same predetermined radio frequency channel which is different than the radio frequency channels which the first and second hubs use for transmitting frames to and receiving frames from their remotes.

39. A communicator as defined in claim 37 wherein the frames are transmitted by radio frequency signals and are received from radio frequency signals, the communicators transmit and receive the radio frequency signals using direct sequence spread spectrum modulation established by a predetermined spreading code, and the predetermined functions further comprise:

the first and second hubs use different spreading codes for transmitting frames to and receiving frames from their remotes than the spreading codes used for transmitting the hub beacon and hub beacon reply frames.

40. A communicator as defined in claim 39 wherein the predetermined functions further comprise:

the first and second hubs transmit and receive the hub beacon frame and the hub beacon reply frame using a predetermined spreading code which is different that the spreading code used by each hub to transmit frames to and receive frames from the remotes of their respective Group.

41. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the hub assigning transmission opportunities to the remotes, each transmission opportunity being an interval for a remote to transmit frames to the hub;

the hub transmitting transmission opportunity allocation information in a frame transmitted by the hub;

the hub transmitting information to the remotes to establish a transmission opportunity request interval during the communication cycle when the remotes are allowed to transmit transmission opportunity request frames to the hub to request transmission opportunity allocations;

the remotes transmitting transmission opportunity request frames to the hub during the transmission opportunity request intervals to request transmission opportunities, the transmission opportunity request frames containing information describing predetermined operational characteristics of the remote transmitting the transmission opportunity request frame;

the hub responding to the information in the transmission opportunity request frame and determining if the remote is better suited to act as the hub based on a comparison of the operational characteristic information of the hub and the remote transmitting the transmission opportunity request frame;

the hub transmitting a hub handoff frame to the remote transmitting the transmission opportunity request frame if the hub has determined that the remote is better suited to act as the hub;

the remote responding to the hub handoff frame by transmitting a handoff acknowledgement frame and commencing to act as the hub after transmitting the handoff acknowledgment frame; and the hub receiving the hub acknowledgement frame commencing to function as a remote after receiving the hub acknowledgement frame.

42. A communicator as defined in claim 41 wherein the communicators are adapted to be connected to a resource to obtain data from and to supply data to the resource, wherein the at least some of the communicators are battery powered, and wherein the predetermined functions further comprise:

the hub determining if the remote is better suited to act as the hub by evaluating predetermined criteria describing operating characteristics obtained from the information of the transmission opportunity request frame and obtained from the hub, the operational characteristics including whether the hub or the remote is battery powered; and the hub determining that the remote is better suited to act as the hub if the remote is not battery powered and the hub is battery powered.

43. A communicator as defined in claim 42 wherein the operating characteristics also include whether the hub or the remote is connected to a resource functioning as a server, and wherein the predetermined functions further comprise:

the hub determining that the remote is better suited to act as the hub if the remote is not connected to a resource functioning as a server and the hub is connected to a resource functioning as a server, after the hub has determined that both the hub and the remote are both connected to or both not connected to battery power.

44. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the communicators transmitting a transfer unit from one communicator to another which contains a plurality of frames;

the remotes transmitting a transfer unit having a header having at least one field containing information describing at least one frame of a previous transmission unit which was not successfully received by the hub; and the hub responding to the field information describing the frame which was successfully received by transmitting in another subsequent transfer unit those remaining frames of the previous transfer unit which were not successfully received.

45. A communicator as defined in claim 44 wherein the frame has two fields containing information describing at least one frame of a previous transmission unit which was not successfully received, one field containing information describing the ending frame number of the last successfully received frame of the transfer unit, and the other field containing information describing a single frame in the plurality of frames in the transfer unit which was not successfully received.

46. A communicator for wirelessly transmitting frames to and receiving frames from a least one additional communicator in accordance with a predetermined medium access control protocol, the communicators which transmit and receive the frames constituting a Group, each communicator including a transmitter and a receiver for transmitting and receiving the frames respectively, the medium access control protocol controlling each communicator of the Group to effect predetermined functions comprising:

designating one of the communicators of the Group as a hub and the remaining the communicators of the Group as remotes;

the hub establishing repeating communication cycles, each of which has intervals during which the hub and the remotes transmit and receive frames;

the hub transmitting information to the remotes to establish the communication cycle and a plurality of predeterminable intervals during each communication cycle, the intervals being ones when the hub is allowed to transmit frames to the remotes, when the remotes are allowed to transmit frames to the hub, and when each remote is expected to receive a frame from the hub;

the remotes powering off their transmitters during times other than those intervals when the remote is allowed to transmit frames to the hub, by using the information transmitted from the hub;

the remotes powering off their receivers during times other than those intervals when the remote is expected to receive a frame from the hub, by using the information transmitted from the hub;

the remotes transmitting frames to the hub during the communication cycle which contain predetermined operational characteristic information of the remote transmitting the frame;

the hub responding to the operational characteristic information in the frame transmitted from each remote and determining if the remote is better suited to act as the hub based on a comparison of the operational characteristic information of the hub and the remote transmitting the frame;

the communicator functioning as the hub transferring the hub functionality to the remote having operational characteristics better suited to act as the hub; and the remote receiving the hub functionality thereafter becoming the hub for the Group and the communicator previously functioning as the hub commencing to function as a remote.

47. A communicator as defined in claim 46 wherein the predetermined functions further comprise:

the hub transmitting information to the remotes to establish a transmission opportunity request interval during the communication cycle when the remotes are allowed to transmit transmission opportunity request frames to the hub to request transmission opportunity allocations;

the remotes transmitting transmission opportunity request frames to the hub during the transmission opportunity request intervals to request transmission opportunities, the transmission opportunity request frames containing information describing the predetermined operational characteristics of the remote transmitting the transmission opportunity request frame;

the hub transmitting a hub handoff frame to the remote transmitting the transmission opportunity request frame if the hub has determined that the remote is better suited to act as the hub;

the remote responding to the hub handoff frame by transmitting a handoff acknowledgement frame and commencing to act as the hub after transmitting the handoff acknowledgment frame; and the hub receiving the hub acknowledgement frame commencing to function as a remote after receiving the hub acknowledgement frame.

* * * * *